United States Patent
Adachi et al.

(10) Patent No.: US 12,250,591 B2
(45) Date of Patent: *Mar. 11, 2025

(54) WIRELESS COMMUNICATION DEVICE AND WIRELESS COMMUNICATION METHOD

(71) Applicant: INTERNATIONAL SEMICONDUCTOR GROUP, Seoul (KR)

(72) Inventors: Tomoko Adachi, Kanagawa (JP); Ryoko Matsuo, Tokyo (JP); Tomoya Tandai, Tokyo (JP)

(73) Assignee: INTERNATIONAL SEMICONDUCTOR GROUP, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/451,200

(22) Filed: Aug. 17, 2023

(65) Prior Publication Data

US 2023/0397052 A1 Dec. 7, 2023

Related U.S. Application Data

(63) Continuation of application No. 17/689,726, filed on Mar. 8, 2022, now Pat. No. 11,778,513, which is a (Continued)

(30) Foreign Application Priority Data

Dec. 1, 2014 (JP) .................................. 2014-243502

(51) Int. Cl.
*H04W 28/20* (2009.01)
*H04B 17/345* (2015.01)
(Continued)

(52) U.S. Cl.
CPC .......... *H04W 28/20* (2013.01); *H04B 17/345* (2015.01); *H04L 5/0039* (2013.01);
(Continued)

(58) Field of Classification Search
CPC ..... H04W 28/20; H04W 48/10; H04W 72/23; H04W 8/22; H04W 72/0453;
(Continued)

(56) References Cited

U.S. PATENT DOCUMENTS 7,664,129 B2  2/2010  Takagi et al.
7,903,607 B2  3/2011  Utsunomiya et al.
(Continued)

FOREIGN PATENT DOCUMENTS

CN  103828457 A  5/2014
EP  2589191 A1  5/2013
(Continued)

OTHER PUBLICATIONS

U.S. Appl. No. 15/445,702, filed Feb. 28, 2017, Adachi et al.
(Continued)

*Primary Examiner* — Mohammed S Chowdhury
(74) *Attorney, Agent, or Firm* — Foley & Lardner LLP

(57) ABSTRACT

According to one embodiment, a wireless communication device includes a transmitter configured to transmit first information to designate a first bandwidth narrower than a maximum available bandwidth extended based on a predetermined channel, and transmit second information to designate a plurality of channels including at least one channel different from a channel used in the first bandwidth among a plurality of channels in the maximum bandwidth: and controlling circuitry configured to control the transmitter.

21 Claims, 21 Drawing Sheets

Related U.S. Application Data continuation of application No. 16/903,570, filed on Jun. 17, 2020, now Pat. No. 11,297,538, which is a continuation of application No. 15/445,528, filed on Feb. 28, 2017, now Pat. No. 10,728,802, which is a continuation of application No. PCT/JP2015/083662, filed on Nov. 30, 2015.

(51) Int. Cl.
  *H04L 5/00* (2006.01)
  *H04W 8/22* (2009.01)
  *H04W 48/10* (2009.01)
  *H04W 72/0453* (2023.01)
  *H04W 72/23* (2023.01)
  *H04W 84/12* (2009.01)

(52) U.S. Cl.
  CPC .......... *H04L 5/0064* (2013.01); *H04L 5/0092* (2013.01); *H04W 48/10* (2013.01); *H04W 72/23* (2023.01); *H04L 5/0007* (2013.01); *H04L 5/0023* (2013.01); *H04W 8/22* (2013.01); *H04W 72/0453* (2013.01); *H04W 84/12* (2013.01)

(58) Field of Classification Search
  CPC .... H04W 84/12; H04B 17/345; H04L 5/0039; H04L 5/0064; H04L 5/0092; H04L 5/0007; H04L 5/0023
  See application file for complete search history.

(56) References Cited

U.S. PATENT DOCUMENTS

| | | | |
|---|---|---|---|
| 8,290,503 B2 | 10/2012 | Sadek et al. | |
| 8,363,578 B1 | 1/2013 | Ramamurthy et al. | |
| 8,811,426 B1 | 8/2014 | Banerjea | |
| 9,100,984 B2 | 8/2015 | Kim et al. | |
| 9,281,928 B2 | 3/2016 | Porat et al. | |
| 9,641,234 B2 | 5/2017 | Moon | |
| 9,800,501 B2 | 10/2017 | Merlin | |
| 10,404,425 B2 | 9/2019 | Adachi et al. | |
| 10,728,802 B2 | 7/2020 | Adachi et al. | |
| 2006/0187942 A1 | 8/2006 | Mizutani et al. | |
| 2006/0203837 A1 | 9/2006 | Shvodian | |
| 2006/0245447 A1 | 11/2006 | Chou et al. | |
| 2011/0222486 A1 | 9/2011 | Hart | |
| 2012/0009888 A1 | 1/2012 | Smadi | |
| 2012/0218983 A1 | 8/2012 | Noh et al. | |
| 2012/0275405 A1 | 11/2012 | Kim et al. | |
| 2013/0064119 A1 | 3/2013 | Montojo et al. | |
| 2013/0265907 A1 | 10/2013 | Kim et al. | |
| 2014/0045514 A1 | 2/2014 | Lee et al. | |
| 2014/0198642 A1 | 7/2014 | Barriac et al. | |
| 2015/0063111 A1 | 3/2015 | Merlin et al. | |
| 2015/0063258 A1 | 3/2015 | Merlin et al. | |
| 2015/0146653 A1 | 5/2015 | Zhang et al. | |
| 2015/0146654 A1 | 5/2015 | Chu et al. | |
| 2015/0172012 A1 | 6/2015 | Abeysekera et al. | |
| 2015/0188675 A1 | 7/2015 | Abeysekera et al. | |
| 2015/0201434 A1 | 7/2015 | Fang et al. | |
| 2016/0007325 A1 | 1/2016 | Seok | |
| 2016/0014725 A1 | 1/2016 | Yu et al. | |
| 2016/0044533 A1 | 2/2016 | Seok | |
| 2016/0057736 A1 | 2/2016 | Jung et al. | |
| 2016/0105836 A1* | 4/2016 | Seok | H04W 72/121 370/331 |
| 2016/0128024 A1 | 5/2016 | Frederiks et al. | |
| 2016/0128102 A1 | 5/2016 | Jauh et al. | |
| 2016/0143006 A1 | 5/2016 | Ghosh et al. | |
| 2016/0165589 A1 | 6/2016 | Chu et al. | |
| 2016/0183305 A1 | 6/2016 | Huang et al. | |
| 2016/0227579 A1 | 8/2016 | Stacey et al. | |
| 2016/0242070 A1 | 8/2016 | Asterjadhi et al. | |
| 2016/0278081 A1 | 9/2016 | Chun | |
| 2016/0309508 A1 | 10/2016 | Li et al. | |
| 2016/0330722 A1 | 11/2016 | Pantelidou et al. | |
| 2016/0353435 A1 | 12/2016 | Ghosh | |
| 2016/0360507 A1 | 12/2016 | Cariou et al. | |
| 2017/0006581 A1 | 1/2017 | Matsuo et al. | |
| 2017/0006596 A1 | 1/2017 | Adachi et al. | |
| 2017/0006606 A1 | 1/2017 | Matsuo et al. | |
| 2017/0006609 A1 | 1/2017 | Adachi et al. | |
| 2017/0026151 A1 | 1/2017 | Adachi | |
| 2017/0079071 A1 | 3/2017 | Zhou et al. | |
| 2017/0127428 A1 | 5/2017 | Adachi et al. | |
| 2017/0127453 A1 | 5/2017 | Adachi et al. | |
| 2017/0171723 A1 | 6/2017 | Adachi | |
| 2017/0180088 A1 | 6/2017 | Adachi et al. | |
| 2017/0181039 A1 | 6/2017 | Adachi et al. | |
| 2017/0188362 A1 | 6/2017 | Cariou et al. | |
| 2017/0196010 A1 | 7/2017 | Ryoko et al. | |
| 2017/0245306 A1 | 8/2017 | Kim et al. | |
| 2017/0289987 A1 | 10/2017 | Seok | |
| 2017/0366321 A1 | 12/2017 | Kim et al. | |
| 2018/0007561 A1 | 1/2018 | Adachi et al. | |
| 2018/0007701 A1 | 1/2018 | Adachi et al. | |
| 2018/0035488 A1 | 2/2018 | Yang et al. | |
| 2018/0048573 A1 | 2/2018 | Merlin et al. | |
| 2018/0077735 A1 | 3/2018 | Ahn et al. | |
| 2018/0084605 A1 | 3/2018 | Li et al. | |
| 2018/0110076 A1 | 4/2018 | Ko et al. | |
| 2018/0124858 A1 | 5/2018 | Gan et al. | |
| 2018/0167882 A1 | 6/2018 | Choi et al. | |
| 2018/0184454 A1 | 6/2018 | Viger et al. | |
| 2018/0376507 A1 | 12/2018 | Kwon et al. | |
| 2019/0230629 A1* | 7/2019 | Chu | H04L 5/0037 |
| 2022/0279528 A1 | 9/2022 | Ahn et al. | |
| 2023/0058825 A1 | 2/2023 | Li et al. | |

FOREIGN PATENT DOCUMENTS

| | | |
|---|---|---|
| EP | 3294036 A1 | 5/2015 |
| JP | 2005-223937 A | 8/2005 |
| JP | 2008-160758 A | 7/2008 |
| JP | 4266192 B2 | 5/2009 |
| JP | 2012-089926 A | 5/2012 |
| JP | 2012-517147 A | 7/2012 |
| JP | 2013-219687 A | 10/2013 |
| JP | 2015-515826 A | 5/2015 |
| JP | 2017-085508 A | 5/2017 |
| JP | 6656347 B2 | 3/2020 |
| JP | 6656348 B2 | 3/2020 |
| WO | WO-2006/000955 A1 | 1/2006 |
| WO | WO-2012/002855 A1 | 1/2012 |
| WO | WO-2013/151847 A2 | 10/2013 |
| WO | WO-2014/014084 A1 | 1/2014 |
| WO | WO-2014/014094 A1 | 12/2014 |
| WO | WO-2015/031431 A1 | 3/2015 |
| WO | WO-2015/068968 A1 | 5/2015 |
| WO | WO-2016/032007 A1 | 3/2016 |
| WO | WO-2016/126370 A1 | 8/2016 |
| WO | WO-2016/175328 A1 | 11/2016 |
| WO | WO-2016/175329 A1 | 11/2016 |

OTHER PUBLICATIONS

U.S. Appl. No. 15/392,391, filed Dec. 28, 2016, Kabushiki Kaisha Toshiba.
U.S. Appl. No. 62/112,894, filed Feb. 6, 2015, Chu et al.
U.S. Appl. No. 15/202,960, filed Jul. 6, 2016, Kabushiki Kaisha Toshiba.
U.S. Appl. No. 15/267,863, filed Sep. 16, 2016, Kabushiki Kaisha Toshiba.
U.S. Appl. No. 15/267,885, filed Sep. 16, 2016, Kabushiki Kaisha Toshiba.
U.S. Appl. No. 16/410,359, filed May 13, 2019, Adachi et al.
U.S. Appl. No. 16/527,852, filed Jul. 31, 2019, Adachi et al.
U.S. Appl. No. 16/519,915, filed Jul. 23, 2019, Adachi et al.
Shimizu: Ima Dakara, Motto Tsukai Konashitai! Windows7 Super Katsuyo Technique (Windows7 Super Practical Use Technique),

(56) References Cited

OTHER PUBLICATIONS

Impress Corp., Aug. 30, 2012, p. 46 and its English machine translation thereof.
IEEE Standards Association/IEEE Computer Society: "Part 11: Wireless LAN Medium Access Control (MAC) and Physical Layer (PHY) Specifications; Amendment 4: Enhancements for Very High Throughput for Operation in Bands Below 6 GHz", IEEE Std 802.11ac™, The Institute of Electrical and Electronics Engineers, Inc., Dec. 2013, pp. 1-425.
IEEE Standards Association/IEEE Computer Society: "Part 11: Wireless LAN Medium Access Control (MAC) and Physical Layer (PHY) Specifications", IEEE Std 802.11™, The Institute of Electrical and Electronics Engineers, Inc., Mar. 2012, pp. 1-2793.
Inoue et al.: "Beyond 802.11ac—A Very High Capacity WLAN", IEEE 11-13/0287r3, NTT, Mar. 2013, pp. 1-12.
Stacey, Robert: "Specification Framework for TGax", IEEE 802.11-15-0132-11-00, Intel, Nov. 2015, pp. 1-37.
Stacey, Robert: "Specification Framework for TGax", IEEE 11-15-0132-02-00ax-spec-framework, Intel, Jan. 2015, pp. 1-3.
Stacey, Robert: "Specification Framework for TGax", IEEE, 11-15-0132-17-00ax-spec-framework, Intel, May 2016, pp. 1-61.
Translation of International Preliminary Report on Patentability mailed Jun. 15, 2017 received in corresponding International Application No. PCT/JP2015/083662.
Adachi et al.: US Office Action on U.S. Appl. No. 15/267,863 dated Jan. 26, 2018.
Adachi et al.: US Office Action on U.S. Appl. No. 15/267,885 dated Apr. 2, 2018.
Rizzoli et al., "Computer-aided noise analysis of integrated microwave front-ends," IEEE MTT-S Digest, 1995, pp. 1561-1564.
US Final Office Action dated Jul. 3, 2018 issued in co-pending U.S. Appl. No. 15/267,863.
US Non-Final Office Action dated Jul. 3, 2018 issued in co-pending U.S. Appl. No. 15/392,391.
US Non-Final Office Action issued Aug. 14, 2018 in co-pending U.S. Appl. No. 15/445,702.
IEEE Std 802.11n-2009, Oct. 29, 2009, pp. 56,76-79, URL: https://ieeexplore.ieee.org/servlet/opac?punumber=5307291.
Stéphane Baron et al.: "RU selection process upon TF-R reception; 11-15-1047-00-00ax-ru-selection-process-upon-tf-r-reception", Canon, IEEE Draft; 11-15-1047-00-00AX-RU-SELECTION-PROCESS-UPON-TF-R-Reception, IEEE-SA Mentor, Piscataway, NJ USA, vol. 802.11ax, Sep. 14, 2015, pp. 1-9, XP068098236, {retrieved on Sep. 14, 2015}.
Stacey, Robert: "Specification Framework for TGax", IEEE 11-15-0132-05-00ax-spec-framework, Intel, May 2015, pp. 1-7.
Stacey, Robert: "Specification Framework for TGax", IEEE 11-15-0132-08-00ax-spec-framework, Intel, Sep. 2015, pp. 1-22.
US Final Office Action dated Aug. 28, 2018 issued in co-pending U.S. Appl. No. 15/267,885.
IEEE Std 802. 11ac-2013, Dec. 11, 2013, pp. 71, 91, 98-99, 186-187, URL, https://ieeexplore.ieee.org/servlet/opac?punumber=6687185.
Adachi, Tomoko et al.: "Reception Status of Frames Transmitted in Random Access RUs", IEEE 802.11-15/1341-02-00 (1341r2), Toshiba, Nov. 2015, pp. 1-10.
Azizi et al.: "OFDMA Numerology and Structure", IEEE 802.11-15/0330r5, INTEL and LGE, May 2015, pp. 1-50.
Ghosh, Chittabrata et al.: "Random Access With Trigger Frames Using OFDMA", IEEE 802.11-15/0604-01, Intel, May 2015, pp. 1-16.
Park, Minyoung: "Specification Framework for TGah", IEEE 802.11-11/1137r15, Intel, May 2013, pp. 1-77.
US Non-Final Office Action dated Jul. 23, 2018 issued in co-pending U.S. Appl. No. 15/445,528.
US Non-Final Office Action dated Jul. 27, 2018 issued in co-pending U.S. Appl. No. 15/202,960.
Notice of Allowance dated Dec. 12, 2018 issued in co-pending U.S. Appl. No. 15/267,863.
Notice of Allowance dated Jan. 23, 2019 issued in co-pending U.S. Appl. No. 15/445,702.
Notice of Allowance dated Feb. 6, 2019 issued in co-pending U.S. Appl. No. 15/267,863.
US Final Office Action dated Mar. 7, 2019 issued in co-pending U.S. Appl. No. 15/202,960 (including U.S. Pat. No. 10,128,925 B2, US 2018/0054240 A1, US 2016/0227533 A1, US 2018/0014316 A1, US 2017/0289933 A1, and US 2016/0374070 A1).
Notice of Allowance dated Mar. 18, 2019 issued in co-pending U.S. Appl. No. 15/267,885 (including US 2014/0198642 A1, US 2016/0360507 A1, US 2017/0366321 A1, US 2018/0035488 A1, and US 2018/0084605 A1).
US Final Office Action dated Feb. 21, 2019 issued in co-pending U.S. Appl. No. 15/392,391 (including US 2017/0188362 A1, US 2017/0079071 A1, US 2018/0077735 A1, US 2018/0035488 A1, US 2016/0128102 A1, US 2017/0366321 A1, US 2016/0360507 A1, US 2016/0353434 A1, and US 2017/0048882 A1).
Notice of Allowance dated May 1, 2019 issued in co-pending U.S. Appl. No. 15/445,702.
Corrected Notice of Allowability dated Jul. 2, 2019 issued in co-pending U.S. Appl. No. 15/267,863.
Notice of Allowance dated Jul. 10, 2019 issued in co-pending U.S. Appl. No. 15/392,391.
US Non-Final Office Action dated Sep. 6, 2019 issued in co-pending U.S. Appl. No. 15/202,960.
Adachi et al., "Regarding trigger frame in UL MU", IEEE 802.11-15/0608r1, IEEE, Internet<URL:https://mentor.ieee.org/802.11/dcn/15/11-15-0608-01-00ax-regarding-trigger-frame-in-ul-mu.pptx>, Apr. 2015.
Girici et al., "Proportional Fair Scheduling Algorithm in OFDMA-Based Wireless Systems with QoS constraints", Journal of Communications and Networks, vol. 12, No. 1, Feb. 2010, pp. 30-42.
Ghosh, Chittabrata et al.: "Random Access With Trigger Frames Using OFDMA", IEEE 802.11-15/0604r0, Intel, May 2015, pp. 1-16.
US Notice of Allowance dated Dec. 4, 2019 issued in co-pending U.S. Appl. No. 15/392,391.
US Final Office Action dated Mar. 12, 2020 issued in co-pending U.S. Appl. No. 15/202,960.
US Non-Final Office Action dated Apr. 29, 2020 issued in co-pending U.S. Appl. No. 16/410,359.
US Notice of Allowance dated Dec. 2, 2020 issued in co-pending U.S. Appl. No. 15/202,960.
US Notice of Allowance dated Nov. 27, 2020 issued in co-pending U.S. Appl. No. 16/410,359.
US Non-Final Office Action dated Dec. 9, 2020 issued in co-pending U.S. Appl. No. 16/519,915.
US Notice of Allowance dated Oct. 5, 2020 issued in co-pending U.S. Appl. No. 15/202,960.
US Non-Final Office Action dated Aug. 21, 2020 issued in co-pending U.S. Appl. No. 16/527,852.
Final Office Action on U.S. Appl. No. 16/519,915 dated Jun. 22, 2021.
US Office Action on U.S. Appl. No. 16/527,852 dated Apr. 26, 2021.
Notice of Allowance on U.S. Appl. No. 16/519,915 dated Nov. 4, 2021.
Notice of Allowance on U.S. Appl. No. 16/527,852 dated Dec. 3, 2021.
Deng et al., IEEE 802.11ax: Next Generation Wireless Local Area Networks, 2014 (Year: 2014).
Notice of Allowance in U.S. Appl. No. 17/199,727 dated Mar. 1, 2023.
Notice of Allowance in U.S. Appl. No. 17/688,337 dated Mar. 17, 2023.
Non-Final Rejection in U.S. Appl. No. 17/689,726 dated Jan. 25, 2023.
Notice of Allowance in U.S. Appl. No. 17/689,726 dated May 24, 2023.
Notice of Allowance in U.S. Appl. No. 17/667,975 dated Jul. 18, 2023.
US Notice of Allowance for U.S. Appl. No. 18/336,129 dated Aug. 14, 2024 (8 pages).

(56) References Cited

OTHER PUBLICATIONS

US Notice of Allowance for U.S. Appl. No. 18/325,224 dated Nov. 27, 2024 (13 pages).

\* cited by examiner

| HT Operational element STA Channel Width field | VHT Operational element Channel Width field | BSS operating channel width |
|---|---|---|
| 0 | 0 | 20 MHz |
| 1 | 0 | 40 MHz |
| 1 | 1 | 80 MHz |
| 1 | 2 | 160 MHz |
| 1 | 3 | 80+80 MHz |
FIG. 10
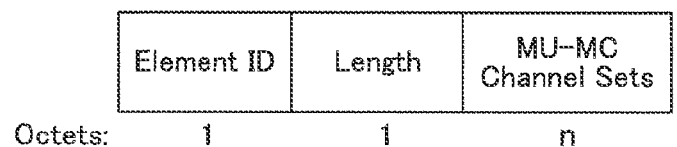
FIG. 11
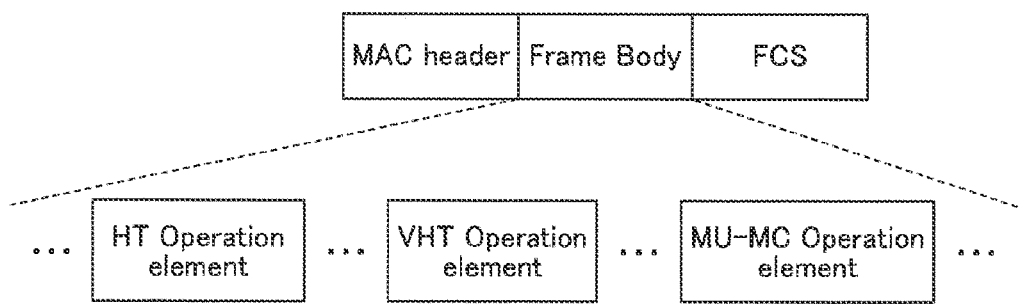
FIG. 12

| Element ID | Length | Minimum Channel Number | Channel Width Information |

FIG. 13A

| Element ID | Length | Channel Number (Lower) | Channel Number (Upper) |

FIG. 13B

| Element ID | Length | Minimum Channel Number 1 | Channel Width Information 1 | Minimum Channel Number 2 | Channel Width Information 2 |

FIG. 14A

| Element ID | Length | Channel Number 1 (Lower) | Channel Number 1 (Upper) | Channel Number 2 (Lower) | Channel Number 2 (Upper) |

FIG. 14B

| Element ID | Length | Channel Width Information 1 |
|---|---|---|

FIG. 15A

| Element ID | Length | Channel Width Information 1 | Channel Width Information 2 |
|---|---|---|---|

FIG. 15B

| Element ID | Length | Channel Width Information 1 | Channel Width Information 2 |
|---|---|---|---|

FIG. 16A

| Element ID | Length | Difference Expansion Information |
|---|---|---|

FIG. 16B

| Element ID | Length | Center Frequency | Channel Width Information |
|---|---|---|---|

FIG. 17

| Element ID | Length (=1) | Secondary Channel Offset |
|---|---|---|
Octets: 1 / 1 / 1

| Element ID | Length | New Channel Width | New Channel Center Frequency Segment 0 | New Channel Center Frequency Segment 1 |
|---|---|---|---|---|
Octets: 1 / 1 / 1 / 1 / 1

| RU# 1 | RU# 2 | RU# 3 | RU# 4 | RU# 5 | RU# 6 | ················ | RU# K-2 | RU# K-1 | RU# K |

FIG. 28A

| RU# 11-1 | RU# 11-2 | RU# 11-3 | ················ | RU# 11-L |

FIG. 28B

| RU# 12-1 | RU# 12-2 | ······ | RU# 11-(L-1) | RU# K-1 | RU# K |

FIG. 28C

WIRELESS COMMUNICATION DEVICE AND WIRELESS COMMUNICATION METHOD

CROSS REFERENCE TO RELATED APPLICATIONS

This application is a continuation of U.S. application Ser. No. 17/689,726, filed Mar. 8, 2022, which is a continuation of U.S. application Ser. No. 16/903,570, filed Jun. 17, 2020, which is based upon and claims the benefit of priority from U.S. application Ser. No. 15/445,528, filed Feb. 28, 2017, now U.S. Pat. No. 10,728,802, which is a continuation of International Application No. PCT/JP2015/083662, filed on Nov. 30, 2015; which is based upon and claims the benefit of priority from Japanese patent application No. 2014-243502, filed Dec. 1, 2014, the entire contents of all of which are hereby incorporated by reference.

FIELD

Embodiments of the present invention relate to a wireless communication device and a wireless communication method.

BACKGROUND

There are a standard that extends a channel width to 40, 80 or 160 MHz, based on a reference channel of 20 MHz width. In this standard, the following bandwidth operation methods are defined: a method called a dynamic method which returns a response in a maximum channel width determined to have no interference and containing the reference channel; and a method called a static method, which does not return a response (i.e., cannot acquire any available channel) if at least one of channels used for transmitting reception frames has interference. Terminals in conformity with this standard mandatorily support at least a bandwidth up to 80 MHz.

Meanwhile, there is a system that is called OFDMA (Orthogonal Frequency Division Multiple Access) or Multi-user Multi-Channel (MU-MC) system, and simultaneously performs transmission destined for multiple terminals in multiple channels or reception from multiple terminals. In the MU-MC system, an MU-MC compliant terminal is expected to be capable of detecting CCA (Clear Channel Assessment) in an individual channel basis and to perform the dynamic operation in response to interference detection, in order to increase throughput by efficiently obtaining a free channel. Also in a case where OFDMA that performs allocation to terminals on a subcarrier basis (Resource Unit; RU) is applied to IEEE 802.11 wireless LAN, it is expected to detect CCA in a unit of existing reference channel width, such as of 20 MHz width, and to perform the dynamic operation in response to interference detection. Furthermore, efficiency of channel use is improved by not imposing the limitation on channel usage with a channel width based on the reference channel as in the afore-mentioned standard, allowing transmission on an individual channel basis, and performing transmission via a channel without interference.

However, in a case of using a channel with at least 80 MHz width and accommodating terminals that support the afore-mentioned standard as legacy terminals, there is a possibility that use of a channel width of 80 MHz or a channel width of 160 MHz by the legacy terminals, particularly, terminals supporting the static method, reduces the efficiency of channel use over the entire system.

Thus, to maintain the efficiency of channel use over the entire system in a high level, it would be better to limit at least use of wide bands by legacy terminals that support the static method. However, legacy terminals do not have means for explicitly notifying another terminal which method the terminals operate in between the dynamic and static methods. Consequently, it is required to assume at least a presence of a legacy terminal that operates according to the static method.

BRIEF DESCRIPTION OF THE DRAWINGS

FIG. 10 is a diagram showing an example of a table that defines the relationship between values set in information fields for the elements in FIGS. 8 and 9 and operation channel widths;

FIG. 11 is a diagram showing a format example of MU-MC Operation element according to the embodiment;

FIG. 12 is a format example of a management frame that stores the elements in FIGS. 8, 9 and 11;

FIG. 13A is a diagram showing a format example of an information field for MU-MC Operation element;

FIG. 13B is a diagram showing a format example of an information field for MU-MC Operation element;

FIG. 14A is a diagram showing another format example of an information field for MU-MC Operation element;

FIG. 14B is a diagram showing another format example of an information field for MU-MC Operation element;

FIG. 15A is a diagram showing another format example of an information field for MU-MC Operation element;

FIG. 15B is a diagram showing another format example of an information field for MU-MC Operation element;

FIG. 16A is a diagram showing still another format example of an information field for MU-MC Operation element;

FIG. 16B is a diagram showing still another format example of an information field for MU-MC Operation element;

FIG. 17 is a diagram showing yet another format example of an information field for MU-MC Operation element;

FIG. 28A is a diagram for illustrating a form of a resource unit;

FIG. 28B is a diagram for illustrating a form of a resource unit;

FIG. 28C is a diagram for illustrating a form of a resource unit;

DETAILED DESCRIPTION

According to one embodiment, a wireless communication device includes a transmitter configured to transmit first information to designate a first bandwidth narrower than a maximum available bandwidth extended based on a predetermined channel, and transmit second information to designate a plurality of channels including at least one channel different from a channel used in the first bandwidth among a plurality of channels in the maximum bandwidth: and controlling circuitry configured to control the transmitter.

Hereinafter, embodiments of the present invention will be described with reference to the drawings.

The entire contents of IEEE Std802.11™-2012 and IEEE Std 802.11ac™-2013 dated Jan. 28, 2016 are herein incorporated by reference in the present specification.

First Embodiment

Figure 1:
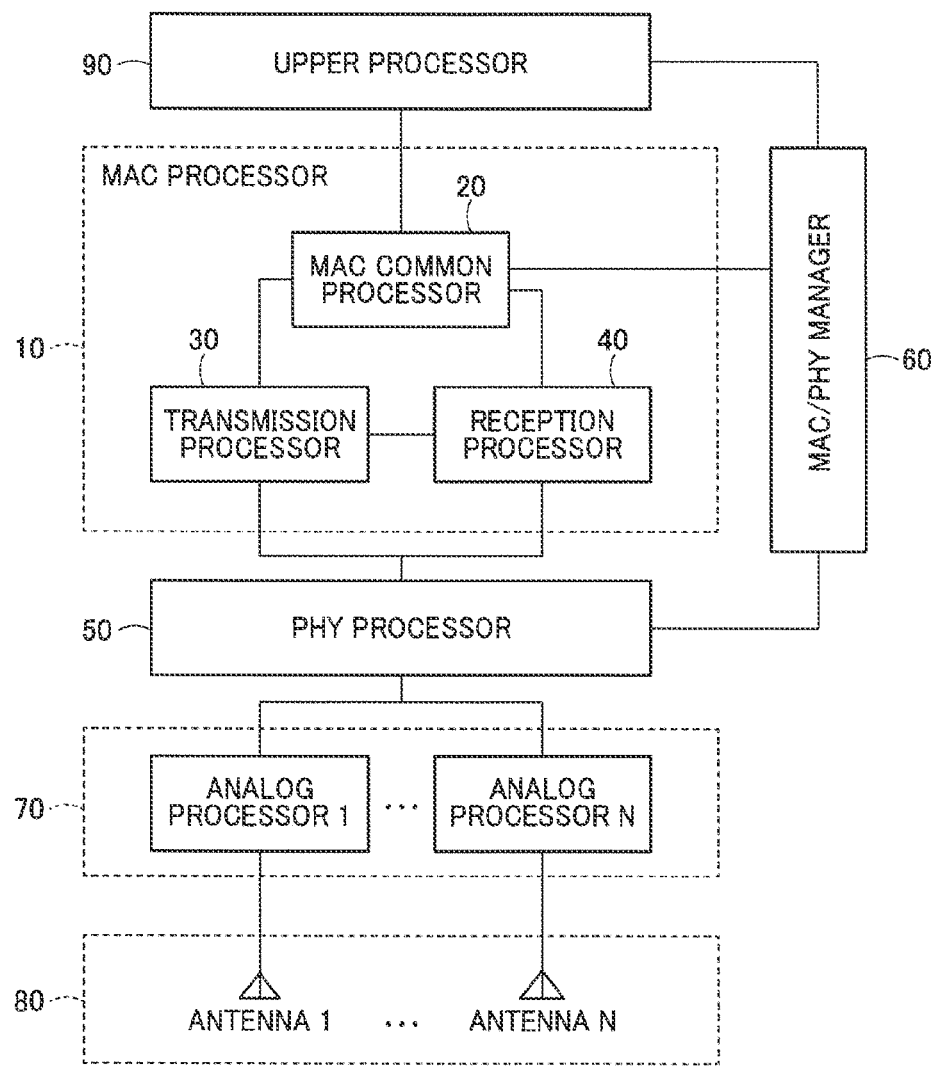
FIG. 1 is a functional block diagram of a wireless communication device according to an embodiment of the present invention.

FIG. 1 illustrates a functional block diagram of a wireless communication device according to the first embodiment of the present invention is illustrated in FIG. 1. This wireless communication device can be implemented in a wireless communication base station (hereinafter referred to as a base station or an access point) or in a wireless communication terminal (hereinafter referred to as a terminal) that communicates with the base station. The base station is one mode of the wireless communication terminal (or the terminal) in that the base station has the same or similar communication functions with those of the terminal with exception of the base station having a relay function. The function of the present invention can be realized in which of the base station and the terminal. When a wireless communication terminal or a terminal is mentioned in the following explanations, it may also refer to a base station as long as the terminal and the base station need not be particularly discriminated from each other.

This embodiment assumes a case of performing OFDMA (Orthogonal Frequency Division Multiple Access) communication where a base station allocates multiple channels to multiple non-base station terminals and performs simultaneous transmission destined for multiple terminals and simultaneous reception from multiple terminals. In this specification, such OFDMA communication is represented particularly as Multi-User Multi-Channel (MU-MG) communication. Also in a case where OFDMA that performs terminal allocation on a subcarrier (Resource Unit (RU)) basis is applied to IEEE 802.11 wireless LAN and where CCA (Clear Channel Assessment) is detected in units of reference channel width (e.g., 20 MHz) as with the case of MU-MC, an embodiment that assumes MU-MC described later is applicable to OFDMA that performs terminal allocation on an RU basis. This is because even OFDMA that performs terminal allocation on the RU basis can determine RU allocation in conformity with a channel width similar to that used by conventional IEEE 802.11 wireless LAN (e.g., for 20, 40, and 80 MHz) in order to maintain backward compatibility. It is however considered that when the channel width to be used for which interference is detected is changed (e.g., change from 80 to 40 MHz), the number of tones used in RU and arrangement thereof may change. MU-MC transmission in downlink from the base station to the multiple terminals is called downlink MU-MC (DL-MU-MC) transmission. MU-MC transmission in uplink from the multiple terminals to the base station is called uplink MU-MC (UL-MU-MC). It is hereinafter assumed that MU-MC communication mainly means DL-MU-MC communication. This embodiment is also applicable to a case of UL-MU-MC communication.

The base station and the terminals according to this embodiment can independently transmit and receive signals in multiple channels (e.g., 20 MHz width for one channel) in a predetermined frequency band (system operation frequency band). Such a capability of transmitting and receiving signals in each channel allows efficient MU-MC communication. In this embodiment, the terminal that supports the scheme having the capability of transmitting and receiving signals independently in each channel is sometimes called an MU-MC compliant terminal (IEEE 802.11ax compliant terminal) (in a case of assuming OFDMA that performs terminal allocation on the basis of subcarrier (resource unit), such an MU-MC compliant terminal may be a terminal that supports IEEE 802.11ax). The MU-MC compliant terminal can detect CCA (Clear Channel Assessment) in units of channels, and communicate in any channel without interference. The base station or the terminals are not required to have a capability of transmitting and receiving signals individually in all the channels. For example, provided that there are channels 1 to 8, a form may be adopted where as to channels 1 to 6, signals can be transmitted and received in each of the channels 1 to 6, and as to channels 7 and 8, signals can be transmitted and received only in a channel set in which channels 7 and 8 are bonded. In this case, it is assumed that busy/idle determination of carrier sensing can be made in units of channel sets.

OFDMA that performs terminal allocation on a subcarrier (resource unit) basis is herein described. The resource-unit-based OFDMA allocates resource units that each include one or more subcarriers and may also be called a subchannel, resource block, frequency block or the like, as communication resources, to the terminals, and simultaneous communication is performed with the multiple terminals on a resource unit basis.

Figure 27:
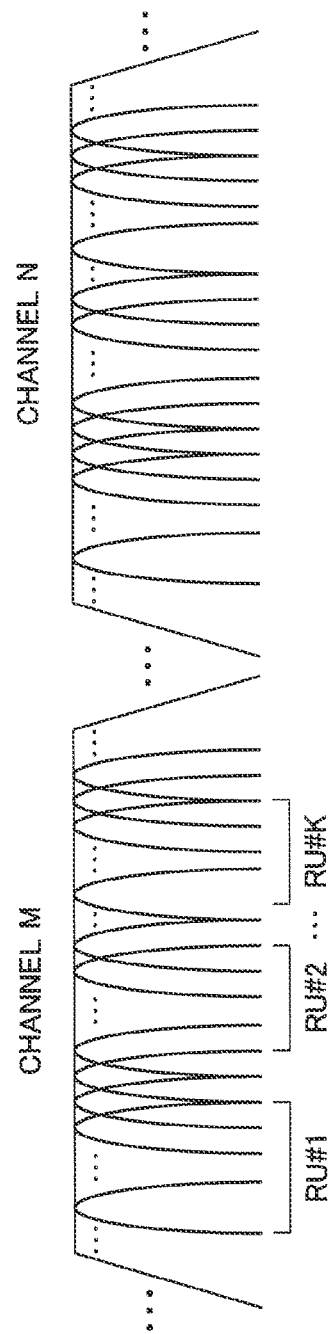
FIG. 27 is a diagram for illustrating resource unit allocation.

The resource unit is a smallest unit of a resource for performing communication. FIG. 27 illustrates the resource units (RU #1, RU #2 . . . RU #K) arranged within a continuous frequency domain of one channel (which is described here as the channel M). A plurality of subcarriers orthogonal to each other are arranged in the channel M, and a plurality of resource units including one or a plurality of continuous subcarriers are defined within the channel M. Although one or more subcarriers (guard subcarriers) may be arranged between the resource units, presence of the guard subcarrier is not essential. A number for identification of the subcarrier or the resource unit may be assigned to each carrier or each resource unit in the channel. The bandwidth of one channel may be for example, though not restricted to these, 20 MHz, 40 MHz, 80 MHz, and 160 MHz. One channel may be constituted by combining a plurality of channels of 20 MHz. The number of subcarriers in the channel or the number of resource units may vary in accordance with the bandwidth. Uplink OFDMA communication is realized by different resource units being simultaneously used by different terminals.

The bandwidths of the resource units (or the number of the subcarriers) may be same among the resource units, or the bandwidths (or the number of the subcarriers) may vary depending on the individual resource units. An exemplary arrangement pattern of the resource units within one channel is schematically illustrated in FIG. 28A to FIG. 28C. The width direction on the paper surface corresponds to the frequency domain direction. FIG. 28A illustrates an example where a plurality of resource units (RU #1, RU #2 . . . RU #K) having the same bandwidth are arranged, and FIG. 28B illustrates another example where a plurality of resource units (RU #11-1, RU #11-2 . . . RU #11-L) having a larger bandwidth than that of FIG. 28A are arranged. FIG. 28C illustrates a still another example where resource units with three types of bandwidths are arranged. The resource units (RU #12-1, RU #12-2) have the largest bandwidth, the resource unit RU #11-(L−1) has the bandwidth identical to that of FIG. 28B, and the resource units (RU #K−1, RU #K) have the bandwidth identical to that of FIG. 28A.

Here, the number of resource units used by each terminal is not limited to a particular value and one or a plurality of resource units may be used. When a terminal uses a plurality of resource units, a plurality of resource units that are continuous in terms of frequency may be used as a bonded resource unit, or a plurality of resource units that are located at positions away from each other may be allowed to be used. The resource unit #11-1 in FIG. 28B may be regarded as one example of a resource unit bonding the resource units #1 and #2 in FIG. 28A.

It is assumed here that subcarriers within one resource unit are continuous in the frequency domain. However, resource units may be defined with use of a plurality of subcarriers that are arranged in a non-continuous manner. The channels used in uplink OFDMA communication are not limited to one single channel but resource units may be reserved in another channel (see the channel N in FIG. 2, for example) arranged at a location away in the frequency domain from the channel M as the case of the channel M and thus the resource units in both the channel M and the channel N may be used. The same or different modes of arranging the resource units may be used for the channel M and the channel N. The bandwidth of the channel N is by way of example 20 MHz, 40 MHz, 80 MHz, 160 MHz, etc. as described above but not limited to them. It is also possible to use three or more channels. It is considered here that the combining of the channel M and the channel N may be regarded as one single channel.

It is assumed here that a terminal that implements OFDMA is successful in carrying out reception and decoding (including demodulation, decoding of error correcting code, etc.) of a physical packet including a frame on a channel of at least the reference channel width (20 MHz channel width if an IEEE 802.11a/b/g/n/ac standard compliant terminal is regarded as a legacy terminal) at the legacy terminal that is to be backward compatible. With regard to the carrier sense, it is carried out in a unit of the reference channel width.

The carrier sense may encompass both physical carrier sense associated with busy/idle of CCA (Clear Channel Assessment) and virtual carrier sense based on medium reservation time indicated in the received frame. As in the case of the latter, a scheme for virtually determining that a medium is in the busy state, or the term during which the medium is virtually regarded as being in the busy state is called Network Allocation Vector (NAV). Here, carrier sense information based on CCA or NAV carried out in a unit of a channel may be universally applied to all the resource units within the channel. For example, resource units belonging to the channel indicated as being in the idle state by the carrier sense information are all in the idle state.

The resource-unit-based OFDMA has thus been described with reference to FIGS. 27 and 28. Embodiments that assume channel-based OFDMA (MU-MC) are described below. As described above, in the case of CCA in units of reference channel widths (e.g., 20 MHz), the embodiment that assumes the MU-MC is also applicable to the resource-unit-based OFDMA.

The base station is assumed to accommodate not only the afore-mentioned MU-MC compliant terminals but also terminals that communicate by extending the number of channels for use to a designated bandwidth (channel width) on the basis of a predetermined channel (reference channel). Such terminals are called legacy terminals in contrast to MU-MC compliant terminals that can transmit and receive signals separately in each channel without limitation of extension from the reference channel. More specifically, IEEE 802.11n compliant terminals and 802.11ac compliant terminals are mainly assumed as the legacy terminals.

IEEE 802.11ac compliant terminals have a function of operating in a channel extended to 40, 80 or 160 MHz based on the reference channel. Extension to 160 MHz is optional. IEEE 802.11n compliant terminals can operate in a channel extended up to 40 MHz based on the reference channel. Extension to 40 MHz is optional.

Figure 29:
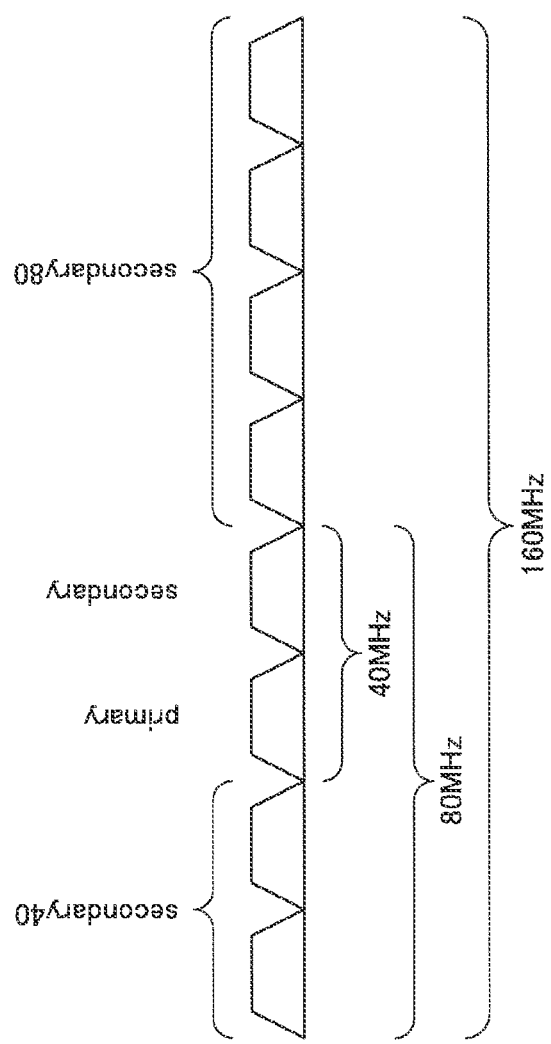
FIG. 29 is a diagram showing an example of a reference channel and an extended channel in IEEE 802.11n and IEEE 802.11ac standards.
Figure 30:
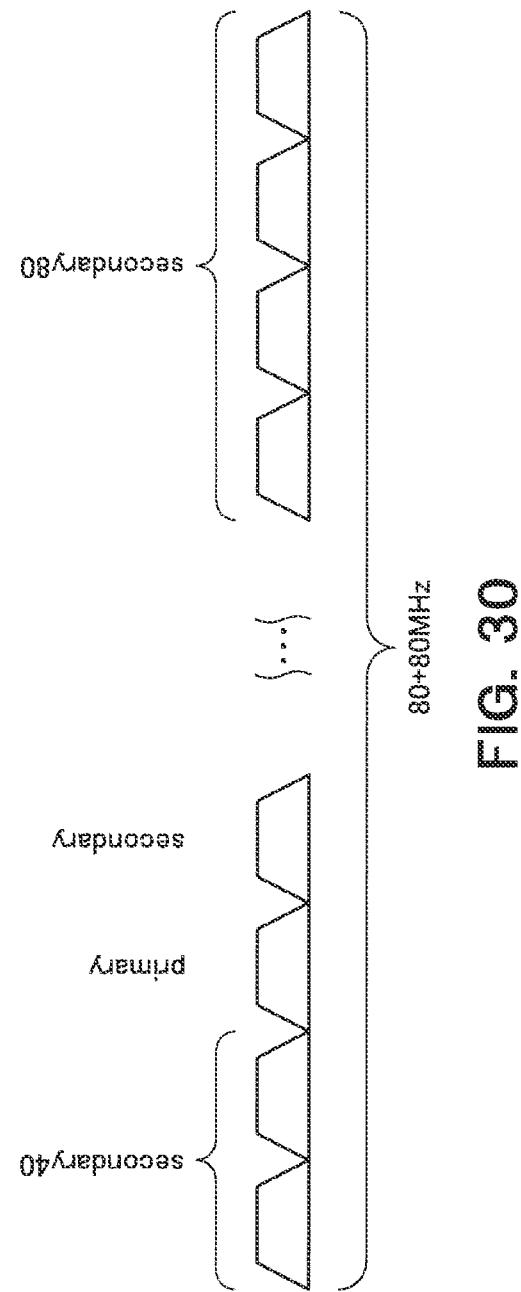
FIG. 30 is a diagram showing another example of a reference channel and an extended channel in IEEE 802.11ac standard.

FIG. 29 and FIG. 30 illustrate examples of the reference channel and the extension channel in IEEE802.11n standard and IEEE802.11ac standard. The content illustrated in FIG. 29 and FIG. 30 is extracted from the written standards of IEEE. As illustrated in FIG. 29, in the case of channel extension to 40 MHz with respect to the reference 20 MHz, the reference channel (primary) and the extension channel (secondary) are used. In the case of channel extension to 80 MHz, the reference channel (primary) and the extension channels (secondary and secondary 40) are used. In the case of channel extension to 160 MHz, the reference channel (primary) and the extension channels (secondary, secondary 40 and secondary 80) are used. In FIG. 29, secondary 80 constitutes one channel segment continuous to primary, secondary or secondary 40. As in FIG. 30, there is another configuration where secondary 80 is positioned apart from a channel segment that is continuous from primary to secondary 40. The channel width (bandwidth) in this case is discriminated from the 160 MHz channel width, and is called "80+80 MHz" channel width. Although 40 MHz channel extension of IEEE 802.11n standard (FIG. 29), 80 or 160 MHz channel extension of IEEE 802.11ac standard (FIG. 29) and 80+80 MHz channel extension of in IEEE 802.11ac standard (FIG. 30) are subjected to a rule of extension for each extended channel with respect to the reference channel, the channels used in this embodiment is not required to be subjected to such a limitation.

The multiple channels used in the MU-MC system described above may be, for example, eight 20 MHz channel widths corresponding to 160 MHz channel width as shown in FIG. 29, or eight 20 MHz channel widths corresponding to 80+80 MHz channel width as shown in FIG. 30. Alternatively, a more number (nine or more) of channels 20 MHz width that contains some (e.g., primary and secondary) or all of the eight channels may be adopted. The channel bandwidth is not limited to 20 MHz. Alternatively, the channel bandwidth may be in units of other channel widths.

As illustrated in FIG. 1, a wireless communication device incorporated in a terminal (which may be either a terminal of non-base station or the base station) includes upper layer processor 90, MAC processor 10, physical (PHY) processor 50, MAC/PHY manager 60, analog processor 70 (analog processors 1 to N), and antenna 80 (antennas 1 to N), where N represents an integer equal to or larger than 1. In the figure, the N analog processors and the N antennas are connected in pairs with each other, but the configuration is not limited to the illustrated one. For example, one analog processor and two or more antennas may be connected to this analog processor in a shared manner.

MAC processor 10, MAC/PHY manager 60, and PHY processor 50 correspond to a mode of controller, controlling circuitry or baseband integrated circuit that carries out processing associated with communications with other terminals (including the base station). Analog processor 70 corresponds, for example, to a wireless communicator or a radio frequency (RF) integrated circuit that transmits and receives signals via antenna 80. The integrated circuit for wireless communication in accordance with this embodiment includes at least the former of the baseband integrated circuit and the RF integrated circuit. The functions of the controller, controlling circuitry or the baseband integrated circuit may be performed by software (programs) that runs on a processor such as a CPU or may be performed by hardware, or may be performed by both of the software and the hardware. The software may be stored in a storage medium such as a memory device including a ROM, a RAM, etc., a hard disk, or an SSD and read therefrom to be executed. The memory device may be a volatile memory device such as an SRAM or a DRAM, or a non-volatile memory device such as a NAND or an MRAM.

Upper layer processor 90 is configured to carry out processing for the Medium Access Control (MAC) layer associated with the upper layer or layers. Upper layer processor 90 can exchange signals with MAC processor 10. As the upper layer, TCP/IP, UDP/IP, and the application layer upper than these two protocols may be mentioned as typical examples but this embodiment is not limited to them. Upper layer processor 90 may include a buffer for exchanging data between the MAC layer and the upper layer or layers. It may also be considered that it may be connectable to a wired infrastructure via upper layer processor 90.

MAC processor 10 is configured to carry out processing for the MAC layer. As described above, MAC processor 10 can exchange signals with upper layer processor 90. Further, MAC processor 10 can exchange signals with PHY processor 50. MAC processor 10 includes MAC common processor 20, transmission processor 30, and reception processor 40.

MAC common processor 20 is configured to carry out common processing for transmission and reception in the MAC layer. MAC common processor 20 is connected to and exchanges signals with upper layer processor 90, transmission processor 30, reception processor 40, and MAC/PHY manager 60.

Transmission processor 30 and reception processor 40 are connected to each other. Also, transmission processor 30 and reception processor 40 are each connected to MAC common processor 20 and PHY processor 50. Transmission processor 30 is configured to carry out transmission processing in the MAC layer. Reception processor 40 is configured to carry out reception processing in the MAC layer.

PHY processor 50 is configured to carry out processing for a physical layer (PHY layer). As described above, PHY processor 50 can exchange signals with MAC processor 10. PHY processor 50 is connected via analog processor 70 to antenna 80.

MAC/PHY manager 60 is connected to upper layer processor 90, MAC processor 10 (more specifically, MAC common processor 20), and PHY processor 50. MAC/PHY manager 60 is configured to manage MAC operation and PHY operation in the wireless communication device.

Analog processor 70 includes an analog-to-digital and digital-to-analog (AD/DA) converter and a radio frequency (RF) circuit. Analog processor 70 is configured to convert a digital signal from PHY processor 50 into an analog signal having a desired frequency and transmit it from antenna 80, or convert a high-frequency analog signal received from antenna 80 into a digital signal. It is considered here that although AD/DA conversion is carried out by analog processor 70, another configuration is also possible according to which PHY processor 50 has the AD/DA conversion function.

The wireless communication device in accordance with this embodiment has its constituent element (i.e., incorporates) antenna 80 in one single chip and thereby makes it possible to reduce the mounting area of antenna 80. Further, in the wireless communication device in accordance with this embodiment, as illustrated in FIG. 1, transmission processor 30 and reception processor 40 shares N antennas 80. By virtue of sharing N antennas 80 by transmission processor 30 and reception processor 40, it is made possible to reduce the size of the wireless communication device of FIG. 1. It is considered here that the wireless communication device in accordance with this embodiment may have a configuration different than the one depicted by way of example in FIG. 1.

In reception of a signal from a wireless medium, analog processor 70 converts an analog signal received by antenna 80 into a baseband signal that can be processed by PHY processor 50, and further converts the baseband signal into a digital signal. PHY processor 50 is configured to receive a digital received signal from analog processor 70 and detect its reception level. The detected reception level is compared with the carrier sense level (threshold). When the reception level is equal to or larger than the carrier sense level, PHY processor 50 outputs a signal indicative of the determination result that the medium (CCA: Clear Channel Assessment) is in the busy state to MAC processor 10 (reception processor 40 to be more precise). When the reception level is less than the carrier sense level, PHY processor 50 outputs a signal indicative of the determination result that the medium (CCA) is in the idle state to MAC processor 10 (reception processor 40 to be more precise).

PHY processor 50 is configured to carry out decoding processing for the received signal, processing of removing a physical header (PHY header) including a preamble, or the like, and extracts a payload. According to IEEE 802.11 standard, this payload is called physical layer convergence procedure (PLCP) service data unit (PSDU) on the PHY side. PHY processor 50 delivers the extracted payload to reception processor 40, and reception processor 40 handles it as a MAC frame. According to IEEE 802.11 standard, this MAC frame is called medium access control (MAC) protocol data unit (MPDU). In addition, PHY processor 50, when it started to receive the reception signal, notifies the fact of having started reception of the reception frame to reception processor 40, and, when it completed the reception of the reception signal, notifies the fact of having completed the reception to reception processor 40. Detail in a case of using A(Aggretgated)-MPDU is described later. Also, PHY processor 50, when the reception signal has been decoded successfully as the physical packet (PHY packet) (when it does not detect an error), notifies the completion of the reception of the reception signal and delivers a signal indicative of the fact that the medium is in the idle state to reception processor 40. PHY processor 50, when it detected an error in the reception signal, notifies the fact that the error has been detected with an appropriate error code in accordance with the error type to reception processor 40. Also, PHY processor 50, at the timing at which the medium has been determined to enter the idle state, notifies a signal indicative of the fact that the medium is in the idle state to reception processor 40.

MAC common processor 20 performs intermediary processing for delivery of transmission data from upper layer processor 90 to transmission processor 30 and for delivery of reception data from reception processor 40 to upper layer processor 90. According to IEEE 802.11 standard, the data in this MAC data frame is called medium access control (MAC) service data unit (MSDU). Detail in a case of using A(Aggretgated)-MSDU is described later. Also, MAC common processor 20 receives instructions from MAC/PHY manager 60 and then converts the instruction into appropriate form of instructions for transmission processor 30 and reception processor 40 and outputs the converted instructions to these units.

MAC/PHY manager 60 corresponds, for example, to station management entity (SME) in IEEE 802.11 standard. In that case, the interface between MAC/PHY manager 60 and MAC common processor 20 corresponds to MAC subLayer management entity service access point (MLME SAP) in IEEE 802.11 standard, and the interface between MAC/PHY manager 60 and PHY processor 50 corresponds to physical layer management entity service access point (PLME SAP) in IEEE 802.11 wireless local area network (LAN).

It is considered here that although MAC/PHY manager 60 in FIG. 1 is illustrated on the assumption that the functional unit for the MAC management and the functional unit for the PHY management are configured to be integral with each other, these units may be separately implemented.

MAC/PHY manager 60 holds a management information base (MIB). The MIB holds various pieces of information, such as the capabilities of the own terminal, and the validities of various functions. For example, information on whether the own terminal is an MU-MC compliant terminal or the own terminal supports MU-MC scheme may also be stored. A memory for holding and managing the MIB may be included in MAC/PHY manager 60, or separately provided without being included in MAC/PHY manager 60. In a case where the memory for holding and managing the MIB is separately provided besides MAC/PHY manager 60, MAC/PHY manager 60 can refer to the other memory and rewrite rewritable parameters in the memory. The base station can receive such information at other non-base station terminals, by means of notification from the terminals which are non-base stations. In this case, MAC/PHY manager 60 can refer to and rewrite information pertaining to other terminals. A memory for storing information pertaining to the other terminals may be held and managed separately from the MIB. In this case, it is configured so that MAC/PHY manager 60 or MAC common processor 20 can refer to or rewrite the other memory. The MAC/PHY manager 60 of the base station may have grouping function for selecting terminals to which channels for MU-MC communication are simultaneously allocated based on various information pertaining to non-base station terminals or requests from the terminals.

MAC processor 10 is configured to handle three types of MAC frames, i.e., a data frame, a control frame, and a management frame, and carry out various processing procedures defined in the MAC layer. Here, the three types of MAC frames are described.

The management frame is for use in management of communication link with another terminal. As the management frame, for example, Beacon frame may be mentioned. The Beacon frame notifies attribute and synchronization information of a group to form a wireless communication group which is a Basic Service Set (BSS) in IEEE 802.11 standard. Also, a frame for authentication or establishing the communication link may also be mentioned. It is considered here that a state where a certain terminal completed exchange of information necessary for establishing a wireless communication with another terminal is expressed here as (the state where) the communication link is established. As the exchange of necessary information, for example, notification of the functions that the device itself supports, and negotiation regarding settings of a scheme may be mentioned. The management frame is generated on the basis of the instruction received by transmission processor 30 from MAC/PHY manager 60 via MAC common processor 20.

With regard to the management frame, transmission processor 30 includes a notifier which notifies various pieces of information to other terminals by the management frame. A terminal that is not a base station may notify information on the terminal itself to the base station by putting in the management frame information regarding such as whether it is an MU-MC-compliant a terminal, IEEE802.11n compliant terminal or a IEEE802.11ac compliant terminal. As for this management frame, for example, Association Request frame used in the association process or Reassociation Request frame used in the reassociation process may be mentioned. The association process and the reassociation process are kinds of steps taken for authentication between the non-base station terminal and the base station. MAC/PHY manager 60 may be provided with a notification controller that controls the notifier so as to transmit the information through a management frame. The notifier of the base station may notify information on MU-MC supportability to the non-base station through the management frame. This management frame may be, for example, a beacon frame, or a probe response frame that is a response to a probe request frame transmitted from the non-base station terminal. MAC/PHY manager 60 may include a notification controller that controls the notifier so as to transmit the information through the management frame. The base station has the function of grouping the terminals connected to the own station and the notifier of the base station may notify the assigned group IDs to the terminals through the management frames. The management frame may be, for example, a group ID management fame. MAC/PHY manager 60 may include a notification controller that controls the notifier so as to transmit the group ID through the management frame. The group ID may be a group ID defined in IEEE Std 802.11ac-2013.

Reception processor 40 has a receiver that receives various types of information via the management frame from other terminals. As one example, the receiver of the non-base station terminal may receive information on whether each terminal is an MU-MC compliant terminal or information on a channel width supported by each terminal (an available largest channel width) in a case of a legacy terminal (IEEE 802.11n compliant terminal or IEEE 802.11ac compliant terminal). The receiver of the base station or the receiver of the terminal may receive information on whether the terminal supports MU-MC communication or the base station supports MU-MC communication.

The examples of the information to be transmitted and received via the management frame as described above are merely examples and various other types of information can be transmitted and received via the management frame between terminals (including the base station). For example, the MU-MC compliant terminal may select a channel which the terminal hopes to use for MU-MC communication from channels determined to not have interference in carrier-sensing and notify information on the selected channel to the base station. In this case, the base station may perform channel allocation to the MU-MC terminals for MU-MC communication. A plurality of channels in use for the MU-MC communication may be all of channels used in the wireless communication system or a part of the channels.

The data frame is for use in transmission of data to another terminal in a state where the communication link is established with the other terminal. For example, data is generated in the terminal by an operation of an application by a user, and the data is carried by the data frame. Specifically, the generated data is delivered from upper layer processor 90, via MAC common processor 20, and to transmission processor 30, the data is put into the frame body field by transmission processor 30 to generate the data frame. The data frame is transmitted via PHY processor 50, analog processor 70 and antenna 80. Also, when reception processor 40 receives the data frame via PHY processor 50 (recognizes that the received MAC frame is a data frame), reception processor 40 extracts the information in the frame body field as data, and delivers the extracted data via MAC common processor 20 to upper layer processor 90. As a result, operations occur on applications such as writing, reproduction, and the like of the data.

The control frame is for use in control in transmission and reception (exchange) of the management frame and the data frame to/from (with) the other wireless communication device. As the control frame, for example, RTS (Request to Send) frame, CTS (Clear to Send) frame may be mentioned which are exchanged with the other wireless communication device to make a reservation of the wireless medium prior to starting exchange of the management frame and the data frame. Also, as another control frame, an acknowledgement response frame for confirmation of delivery of the received management frame and the data frame may be mentioned. As examples of the acknowledgement response frame, ACK frame and BA (BlockACK) frame may be mentioned. These control frames are also generated in the transmission processor 30. With regard to the control frames (CTS frame, ACK frame, BA frame, etc.) transmitted as a response to the received MAC frame, reception processor 40 determines whether or not transmission of a response frame (control frame) is necessary, and outputs information necessary for frame generation (type of the control frame, information specified in the RA (Receiver Address) field, and the like) to transmission processor 30 along with the transmission instruction. Transmission processor 30 generates an appropriate control frame on the basis of the information necessary for generation of the frame and the transmission instruction.

When a MAC frame is transmitted on the basis of CSMA/CA (Carrier Sense Multiple Access with Carrier Avoidance), MAC processor 10 needs to acquire the access right (transmission right) on the wireless medium. Transmission processor 30, on the basis of carrier sense information from reception processor 40, measures transmission timing. Transmission processor 30, in accordance with the transmission timing, gives the transmission instruction to PHY processor 50, and further delivers the MAC frame thereto. In addition to the transmission instruction, transmission processor 30 may instruct a modulation scheme and a coding scheme to be used in the transmission. In addition to them, transmission processor 30 may provide an instruction regarding the transmission power. When MAC processor 10, after having acquired the access right (transmission right), obtained the period of time during which the medium can be occupied (Transmission Opportunity; TXOP), then MAC processor 10 is allowed to continuously exchange the MAC frames with other wireless communication devices although there is some limitation based on such as the QoS (Quality of Service) attribute. The TXOP is acquired, for example, when the wireless communication device transmits a predetermined frame (for example, an RTS frame) on the basis of CSMA/CA (Carrier Sense Multiple Access with Carrier Avoidance) and successfully receives a response frame (for example, a CTS frame) from another wireless communication device. When this predetermined frame is received by the other wireless communication device, the other wireless communication device transmits the above response frame after the elapse of the minimum frame interval (Short InterFrame Space; SIFS). Also, as a method of acquiring the TXOP without using the RTS frame, for example, cases may be mentioned where data frame that directly requests transmission of the acknowledgement response frame by unicast is transmitted (as will be described later, this frame may be a frame in the form of aggregated frames or aggregated payloads) or a management frame that requests transmission of the acknowledgement response frame is transmitted, and acknowledgement response frame (ACK frame, BlockACK frame or the like) in response thereto is successfully received. Alternatively, when a frame is transmitted that does not request, for the other wireless communication device, transmission of the acknowledgement response frame, in which a period equal to or longer than a time period needed to transmit this frame is specified in the Duration/ID field of the frame, then it may be interpreted that with the transmission of this frame, TXOP of the period described in the Duration/ID field has been acquired.

Reception processor 40 is configured to manage the carrier sense information. The carrier sense information is managed in units of a channel (or in units of a channel set as describe in the above). This carrier sense information includes both physical carrier sense information regarding busy/idle states of the medium (CCA) input from PHY processor 50 and virtual carrier sense information on the basis of the medium reservation time described in the received frame. If either one of these carrier sense information pieces indicates the busy state, then the medium is regarded as being in the busy state in which transmission is prohibited. It is considered here that in IEEE 802.11 standard, the medium reservation time is described in the Duration/ID field in the MAC header. MAC processor 10, when having received a MAC frame that is addressed to other wireless communication devices (that is not addressed to the device itself), determines that the medium is virtually in the busy state from the end of the physical packet including this MAC frame over the medium reservation time. A scheme of this type for virtually determining that a medium is in the busy state, or the term during which the medium is virtually regarded as being in the busy state is called Network Allocation Vector (NAV).

Here, the data frame may be a frame such that a plurality of MAC frames (i.e., MPDUs or sub-frames) are aggregated with each other or payload portions of a plurality of MAC frames are aggregated with each other. The former data frame is called an A (Aggregated)-MPDU and the latter data frame is called an A (Aggregated)-MSDU (MAC service data unit) in IEEE 802.11 standard. In the case of the A-MPDU, a plurality of MPDUs are aggregated with each other within the PSDU. Also, as a MAC frame, in addition to the data frame, the management frame and the control frame are also eligible for this aggregation. In the case of the A-MSDU, MSDUs which are a plurality of data payloads are aggregated with each other within the frame body of one MPDU. In both cases of the A-MPDU and the A-MSDU, partition information (length information, etc.) is stored in the frame such that the aggregation of the MPDUs and aggregation of MSDUs can be appropriately deaggregated by the terminal on the reception side. Both of the A-MPDU and the A-MSDU may be used in combination. Also, the A-MPDU may involve not a plurality of MAC frames (MPDUs or sub-frames) but one single MAC frame, and also in this case the partition information is stored in the frame. Also, when responses to the plurality of MAC frames are collectively transmitted in such a case of the data frame being A-MPDU, a BA (BlockACK) frame is used as the responses instead of the ACK frame.

According to IEEE 802.11 standard, several procedures are defined in multiple stages to be taken for a terminal that is not the base station to participate in a BSS (which is called Infrastructure BSS) configured with the base station amongst others and to perform exchange of data frames within the BSS. For example, there is provided a procedure called association, according to which an Association Request frame is transmitted from the terminal that is not the base station to the base station to which the terminal requests the connection. The base station, after having transmitted an ACK frame for the association request frame, transmits an Association Response frame which is a response to the association request frame. The terminal stores the capability of the terminal itself in the association request frame and transmits this association request frame, and thus can make notification of the capability of the terminal itself to the base station. For example, the terminal may add, to the association request frame, a channel width supported by the terminal itself and information for identifying the standard supported by the terminal itself and transmit this association request frame. This information may be also set in the frame transmitted by the procedure called reassociation (reassociation) to reconnect to another base station. In this procedure of reassociation, a Reassociation Request frame is transmitted to the base station to which reconnection is requested from the terminal. The base station, after having transmitted the ACK frame in response to the reassociation request frame, transmits a reassociation response which is a response to the reassociation request frame. As the management frame, in addition to the association request frame and the reassociation request frame, a beacon frame, a probe response frame, etc. may be used. The beacon frame is basically transmitted by the base station, and can store parameter notifying the capability of the base station itself along with the parameters indicating the attributes of the BSS. In view of this, as the parameter notifying the capability of the base station itself, the base station may be adapted to add the information on whether or not MU-MC is supported by the base station. The probe response frame is a frame transmitted from a terminal (base station) that transmits the beacon frame in response to a probe request frame received. The probe response frame is basically the one that notifies the same content as that of the beacon frame, and the base station, when it uses the probe response frame, can notify the information on whether or not MU-MC is supported by the base station to the terminal that transmitted the probe request frame. This embodiment assumes MU-MC communication. For communication based on the assumption of MU-MC, conformity to MU-MC communication is an obvious necessary requirement. Consequently, notification on conformity with MU-MC communication is not a necessary requirement: however, notification to the MU-MC terminals allows setting for MU-MC communication at those terminals, such as setting a transmission filter or a reception filter, for example.

It is considered here that if notification of some piece or pieces of information among the pieces of information mentioned above leads to definition of the content of another piece or other pieces of information, then notification of the other piece or pieces of information may be omitted. For example, suppose a case where a terminal is always an MU-MC compliant terminal if a capability that is compliant with a new standard or specifications is defined and as long as the terminal is compliant with that capability or specifications. In this case, notification of the fact that the terminal is an MU-MC compliant terminal may not need to be explicitly performed.

In this embodiment, the base station assumes that the legacy terminals (IEEE 802.11n compliant terminals, IEEE 802.11ac compliant terminals) and MU-MC compliant terminals coexist, and this embodiment has characteristics that achieve MU-MC communication while maintaining high channel efficiency.

Figure 2:
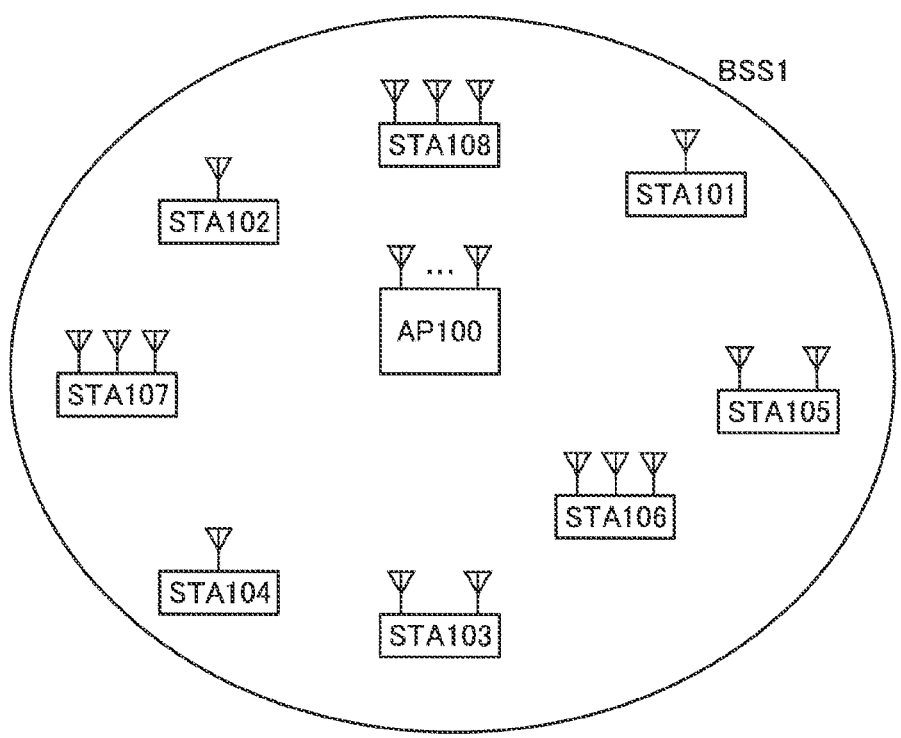
FIG. 2 is a diagram showing a wireless communication group formed of a base station and multiple terminals.

FIG. 2 shows a wireless communication system or BSS1 that includes base station (AP: Access Point) 100 according to this embodiment and multiple terminals (STA: STAtion) 101 to 108 serving as non-base stations. Among multiple terminals 101 to 108, there are MU-MC compliant terminals and legacy terminals (any one type of IEEE 802.11n compliant terminals and IEEE 802.11ac compliant terminals).

IEEE 802.11ac has bandwidth operation methods with respect to exchange of the RTS frame and CTS frame: a method which is called a dynamic method, which returns a response (CTS frame) in a maximum channel width determined to have no interference and containing the reference channel; and a method which is called a static method, which does not return a response (CRS frame) in any channel if at least one of channels used for transmitting the RTS frame has interference. The response according to the former method is called a dynamic response, and the response according to the latter method is called a static response. A terminal that performs the dynamic response is called a dynamic operation terminal, and a terminal that performs the static response is called a static operation terminal, in some cases. As described above, IEEE 802.11ac specifies that the channel is extended, based on 20 MHz width of the reference channel, to 40, 80 or 160 MHz width. The support of at least up to the 80 MHz channel width is mandatory, while the 160 MHz channel width is optional. IEEE 802.11n specifies that the channel is extended, based on 20 MHz width of the reference channel, to 40 MHz width. Extension to 40 MHz is optional. Hereinafter, the dynamic response and static response are described using specific examples assuming IEEE802.11ac compliant terminals.

Figure 3:
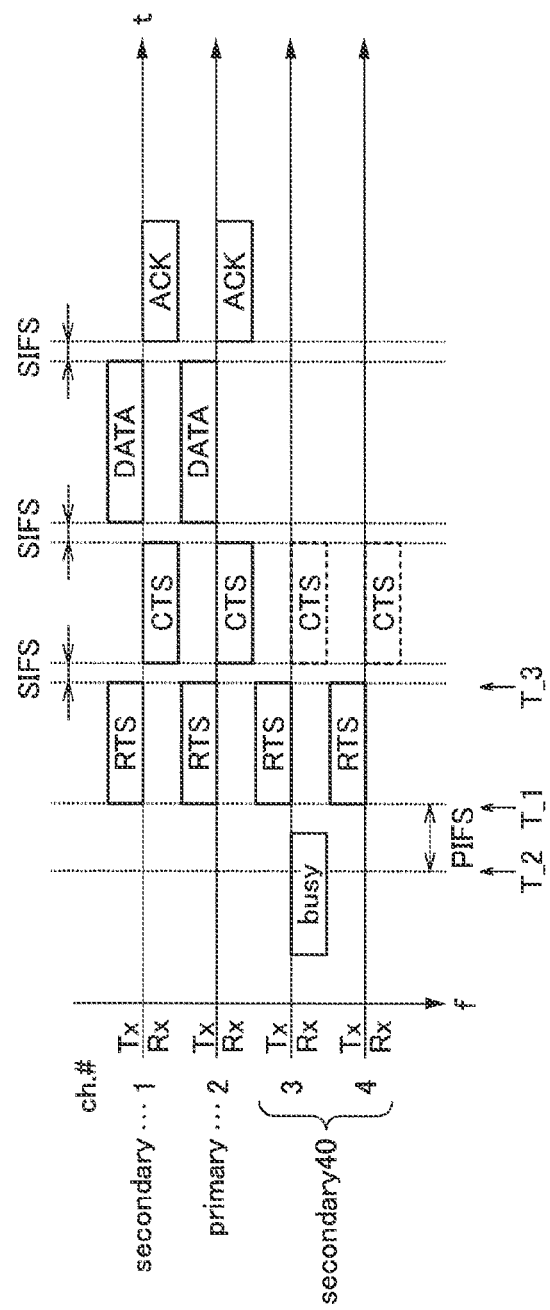
FIG. 3 is a diagram illustrating an operation example of a dynamic response.

FIG. 3 shows an example of an operation sequence in a case where the RTS frame transmitting side is a dynamic operation terminal, and the CTS frame transmitting side (RTS frame receiving side) is also a dynamic operation terminal. As an example, a case is assumed where the RTS frame transmitting side is IEEE 802.11ac compliant base station, and the CTS frame transmitting side is IEEE 802.11ac compliant terminal. In this case, the dynamically operating RTS frame transmitting side may be an MU-MC compliant base station. The fact that the RTS frame transmitting side is the dynamic operation terminal means that the dynamic operation terminal can dynamically respond if the dynamic operation terminal receives the RTS frame from another terminal, and can dynamically change the occupied channel width used as TXOP in conformity with the dynamically responding CTS frames.

Here, as multiple channels, channels with channel numbers (ch. #) 1 to 4 (channels 1 to 4) are present. Channel 2 corresponds to primary channel, which serves as a reference channel. Channel 1 corresponds to secondary channel. Channels 3 and 4 correspond to secondary 40 channel (see FIGS. 29 and 30 described above). It is assumed that the wireless communication system (BSS) uses CSMA/CA (Carrier Sense Multiple Access with Carrier Avoidance), and the base station can perform carrier sensing in each of channels 1 to 4. It is herein assumed that terminal serving as non-base stations are 802.11ac compliant terminal and dynamically operate. Consequently, the terminal perform carrier sensing in units of primary, secondary and secondary 40. The reference channel (primary) may be a channel where not only physical carrier sensing but also virtual carrier sensing is executed. The extended channels (secondary and secondary 40) may be channels where only physical carrier sensing is executed. That is, in order to reduce the implementation load for monitoring the carrier sensing state on the extended channel side, the time for monitoring the carrier sensing state on the extended channel side may be limited.

FIG. 3 shows transmission and reception states in channels 1 to 4 where the abscissa axes indicate time. On the upper side of each abscissa axis, the transmission state of the base station is represented. On the lower side of each abscissa axis, the reception state of the base station is represented. It is herein assumed that base station (AP100) transmits the RTS frames to the terminal (e.g., STA108) using channels 1 to 4.

Here, the RTS frames are, for example, frames that are simultaneously transmitted as completely identical PHY packets 20 MHz width in channels 1 to 4, and are called duplicate PPDUs (Physical Layer Convergence Procedure (PLCP) Protocol Data Units) in IEEE 802.11n standard and IEEE 802.11ac standard. In this case, it is a matter of course that also on the MAC frame level, the same frames are adopted.

Upon receipt of the RTS frames transmitted from the base station in duplicate PPDUs, the terminal determines the channels in which the CTS frames can be transmitted in response to the RTS frames. In this case, with respect to the reference channel, reception processor 40 uses determination process that is executed in CSMA/CA for use only in one channel; such as whether the time is within the duration of NAV set by the frames having been received. On the other hand, with respect to channels 1, 3 and 4 corresponding to the extended channels, it is confirmed whether CCA is detected to be busy in channels 2 to 4 during a time period from time point (T_1) of starting reception of the RTS frame received in duplicate PPDU to time point (T_2) which is a certain fixed time period before the starting time point. That is, reception processor 40 is not required to observe CCA information continuously on the extended channel side. Only CCA information in a certain limited duration is required to be used.

Here, the certain fixed time period is, for example, PIFS (Point Coordination Function (PCF) Interframe Space) in IEEE 802.11 standard. PIFS is an InterFrame Space (IFS) used to obtain an access having a priority in CSMA/CA. PIFS is defined as a value obtained by adding Slot Time defined based on a minimum time for detecting CCA and transmission and reception switching time to SIFS (Short InterFrame Space) used for response frame transmission and burst transmission.

In FIG. 3, in a duration from time point T_2 to a time point of starting RTS reception, CCA is busy in channel 3 (AP100 does not detect the busy state of CCA in channel 3 before RTS frame transmission due to a hidden terminal or the like). Consequently, reception processor 40 determines that channel 3 is in use. The terminal is a dynamic operation terminal. Consequently, the terminal returns the CTS frame in a channel with a maximum channel width without interference based on channel 2 as the primary channel. Channel 1 has no interference. As to channels 3 and 4, channel 4 has no interference while channel 3 has interference. Consequently, the maximum channel width without interference based on the primary is 40 MHz channel width in which channels 2 and 1 are combined (i.e., primary and secondary). Accordingly, the terminal transmits the CTS frames in channels 1 and 2. "CTS" encircled by solid line frames represents a CTS frame. "CTS" encircled by broken line frames represents that no CTS frame is transmitted.

The base station having received the CTS frames in channels 1 and 2 grasps that channels 3 and 4 cannot be used for the terminal, and transmits data frames to the terminal using channels 1 and 2 (i.e., primary and secondary). The data frame is represented as "DATA". The base station transmits data frames SIFS after receipt of the CTS frame in channels 1 and 2. Upon successful receipt of the data frames in channels 1 and 2, the terminal transmits ACK frames in channels 1 and 2 SIFS after receipt of the data frames accordingly.

In the above example, channel 3 has interference. Consequently channel 3 cannot be used even though channel 4 has no interference (i.e., secondary 40 cannot be used). If channel 2 has no interference but channel 1 has interference, channel 2, that is, the reference channel itself is the maximum channel width without interference based on the primary irrespective of presence or absence of interference in channels 3 and 4, and the CTS frame is returned only in channel 2. Consequently channels 3 and 4 cannot be used (i.e., secondary 40 cannot be used) even though channels 3 and 4 have no interference. In a case where channel 2 itself, which is the reference channel, has interference, the CTS frame is not returned in any channel irrespective of presence or absence of interference in channels 1, 3 and 4, and channels 1, 3 and 4 cannot be used. In a case where all of channels 1 to 4 have no interference, the CTS frame is returned in each of channels 1 to 4. In the case where the RTS frame transmission side and CTS frame transmission side are dynamic operation terminals, some channels even without interference cannot be used in some cases. Thus, it cannot be said that the efficiency of channel use is high.

Figure 4:
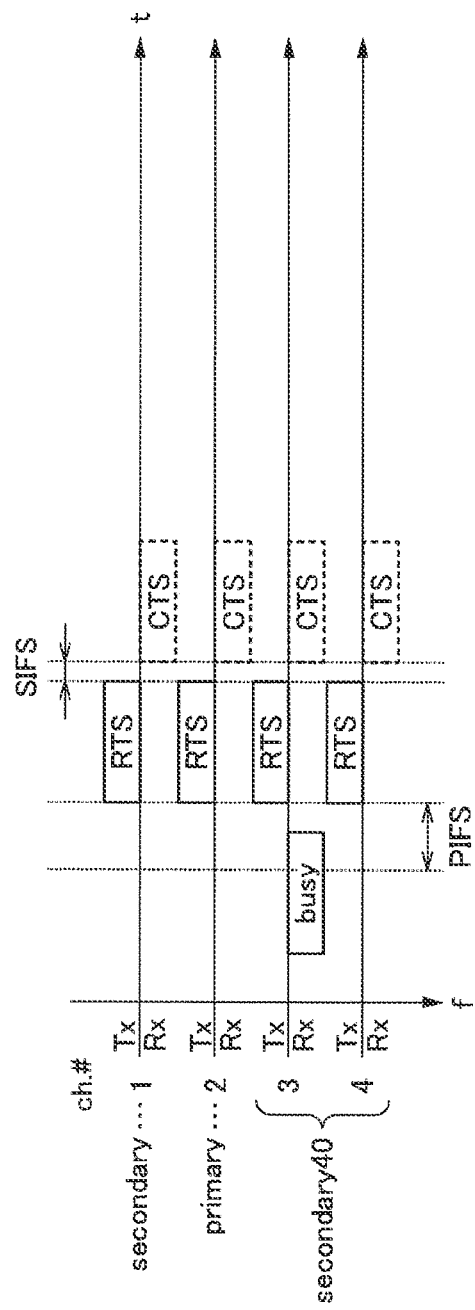
FIG. 4 is a diagram illustrating an operation example of a static response.

FIG. 4 shows an example of an operation in a case where the RTS frame transmitting side is a dynamic operation terminal, and the CTS frame transmitting side is a static operation terminal. As an example, a case is assumed where the RTS frame transmitting side is IEEE 802.11ac compliant base station, and the CTS frame transmitting side is IEEE 802.11ac compliant terminal. In this case, the dynamically operating RTS frame transmitting side may be an MU-MC compliant base station. As with FIG. 3, the RTS frames are transmitted to the terminal in channels 1 to 4. The terminal determines the channel in which the terminal can transmit the CTS frame. As with FIG. 3, even though channels 1, 2 and 4 have no interference, CCA is busy in channel 3 (AP100 does not detect the busy state of CCA in channel 3 before RTS frame transmission due to a hidden terminal or the like). Consequently, the terminal determines that channel 3 is in use. The terminal is a static operation terminal. Consequently, when the terminal detects a busy state in any one of channels 1 to 4 that support the operation channel width (here 80 MHz), the terminal returns no CTS frame. Only in a case where all of channels 1 to 4 have no interference, the CTS frames are transmitted in channels 1 to 4. In this example, channel 3 is busy. Consequently, even though busy state is not detected in channels 1, 2 and 4, the CTS frame is not transmitted in any channel, and not only one channel can be used. Consequently, the efficiency of channel use becomes significantly low. It is considered that the base station, which determines not to receive the CTS frame from the terminal in any channel within a certain time period after RTS frame transmission, subsequently performs an operation again, such as RTS frame transmission in channels 1 to 4, for example. In this example, the other terminals (the terminals other than the base station having transmitted the RTS frame) do not detect receipt of the CTS frame responded to the RTS frame transmitted by the base station, and no signal is detected SIFS after assumed CTS frame. Consequently, NAV can be canceled in the other terminals (in this case, the other terminals are allowed to transmit).

The example of FIG. 4 assumes that the RTS frame transmitting side is a dynamic operation terminal and the CTS frame transmitting side is a static operation terminal. Also in another case where the RTS frame transmitting side is a static operation terminal (e.g., 802.11ac compliant base station that performs the static operation), and the CTS frame transmitting side is a dynamic operation terminal (e.g., 802.11ac compliant terminal that performs the dynamic operation), the sequence is analogous to that of FIG. 4. The fact that the RTS frame transmitting side is the static operation terminal means that the static operation terminal transmitting the RTS frame statically responds if the static operation terminal receives the RTS frame from another terminal, and cannot dynamically change the occupied channel width used as TXOP in conformity with the dynamically responding CTS frames. In this case, even if the terminal on the RTS frame receiving side is a dynamic operation terminal, this terminal returns no CTS frame in any channel upon receipt of detection of a busy state in at least one of channels 1 to 4. Only in a case where all of channels 1 to 4 have no interference, the CTS frame is transmitted in channels 1 to 4. That is, the dynamic operation terminal on the RTS frame receiving side responds in conformity with the capability of the static operation terminal on the RTS frame transmitting side, i.e., in the case static. This is because even if the RTS frame receiving side (dynamic operation terminal) detects the busy state in channel 3 and returns the CTS frames only in channels 1 and 2, the terminal on the RTS frame transmitting side cannot grasp that the frame is a response in the restricted channel width. Consequently, the efficiency of channel use becomes significantly low. The scrambling sequence for configuring the PHY packet that contains the RTS frame includes the attribute of the terminal on the RTS frame transmitting side whether the terminal is dynamic or static. Consequently, the terminal on the RTS frame receiving side, that is, the CTS frame transmitting side, grasps the attribute of the terminal on the RTS transmitting side. Also in a case where the RTS frame transmitting side is a static operation terminal and the CTS frame transmitting side is a static operation terminal, the sequence is analogous to that of FIG. 4. Thus, the efficiency of channel use becomes significantly low.

The examples of FIGS. 3 and 4 show the cases where the channel can be extended to secondary or secondary 40 based on the primary channel. A case where the channel can be extended further to secondary 80 can be considered in an analogous manner. Although the terminal on the RTS frame receiving side is IEEE 802.11ac compliant terminal, also in a case where the terminal is IEEE 802.11n compliant terminal and is a static operation terminal or a dynamic operation terminal, an analogous sequence is adopted accordingly. In this case, the channel extension is up to secondary. Consequently, RTS frame transmission to IEEE 802.11n compliant terminal is in a case of using 40 MHz width at the maximum. Here, the transmission is in channel 2 (primary) and channel 1 (secondary). In a case where IEEE 802.11n compliant terminal supports neither the static nor dynamic scheme, a case of responding with the same channel width as the width of the channel occupied by the received PHY packet can be considered. That is, even when carrier sensing is busy in secondary, if it is determined that the PHY packet occupying the channel width of 40 MHz is received, a response is sometimes returned in the channel width of 40 MHz. In this case, even in a case of a channel in which transmission is performed from another terminal, transmission is further performed in this channel, and CSMA/CA cannot correctly operate. Consequently, the multiple channels cannot be appropriately shared with the other system. This is because when 802.11n standard (IEEE Std 802.11n-2009) was defined, the static and dynamic concept was not introduced.

It is considered that the legacy terminal described with reference to FIGS. 3 and 4, in particular, the legacy terminal that performs a static response (IEEE 802.11n compliant terminal, IEEE 802.11ac compliant terminal) is accommodated, and the base station performs DL-MU-MC transmission. The MU-MC compliant terminal according to this embodiment can transmit and receive independently on a channel-by-channel basis without limitation such as channel extension from the reference channel. Consequently, in a case where MU-MC communication is performed and all the terminals are only MU-MC compliant terminals according to this embodiment, for example, the RTS frames are transmitted to the multiple terminals serving as MU-MC targets in all the channels used for MU-MC communication, and the terminals having received the RTS frames may separately return the CTS frames in channels where no busy state is detected in carrier sensing. The base station may simultaneously transmit data frames (DL-MU-MC transmission) in channels where the CTS frames are returned. Thus, all the channels where each terminal has detected no busy state can be used, which facilitates efficient use of the channels. However, in a case where the legacy terminal that performs a static response is included as a target of MU-MC communication, there is a possibility that the efficiency of channel use is reduced because of the reason described above. Even in the legacy terminal that performs a dynamic response, the efficiency of channel use is sometimes reduced; however, the degree of reduction is not comparable to the legacy terminal that performs a static response. Consequently, in a case where the legacy terminal is included as a target of MU-MC communication, there is a possibility that the efficiency of channel use is reduced any way. Hereinafter, an example of reduction in efficiency of channel use in a case where the legacy terminal that performs a static response (or dynamic response) and MU-MC compliant terminal coexist.

Figure 5:
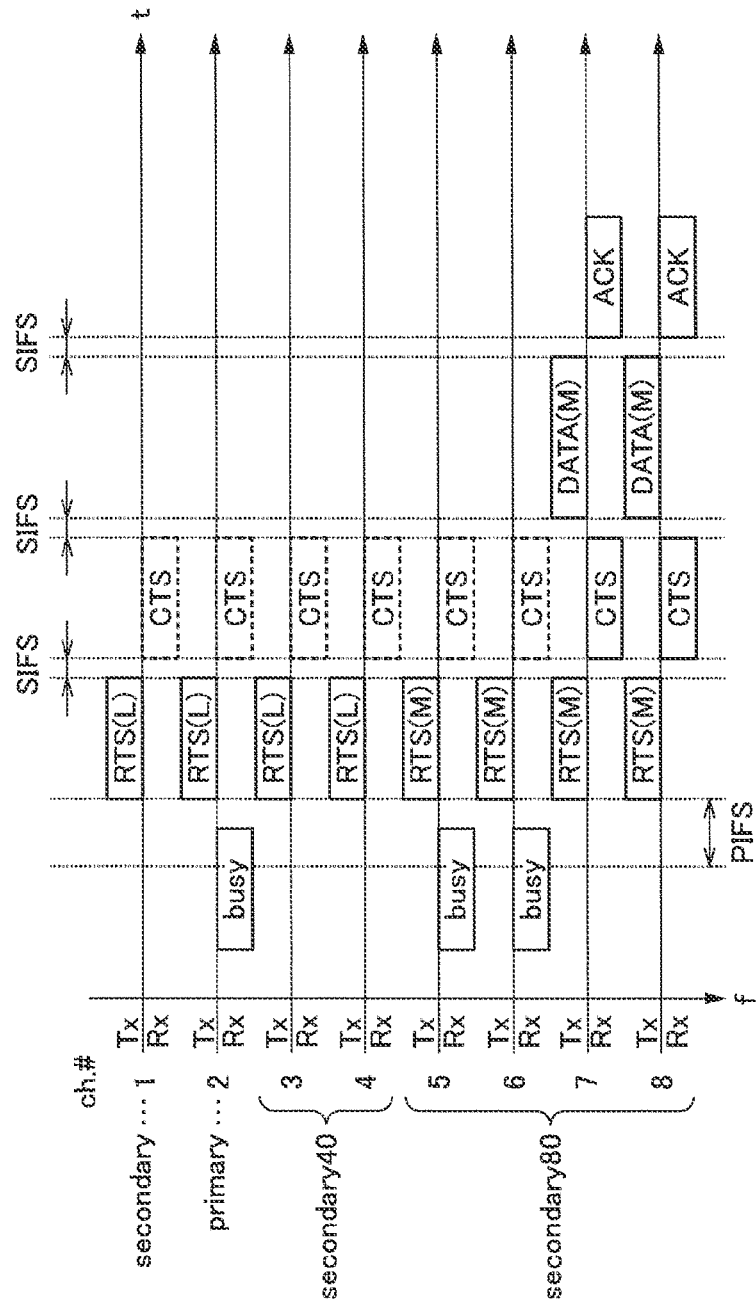
FIG. 5 is a diagram illustrating an operation example in a case where legacy terminals and MU-MC compliant terminals coexist.

FIG. 5 is a diagram illustrating an operation example in a case where a legacy terminal that performs a static response and MU-MC compliant terminal coexist. For example, a case is assumed where the first terminal is a legacy terminal that supports IEEE 802.11ac, performs a static response, and supports channel extension up to secondary 40 (80 MHz) and operates and the second terminal is an MU-MC compliant terminal. In FIG. 5, parenthesized alphabetical letters such as in representation of "RTS(L)" and "RTS(M)" indicate whether the destined terminal is the legacy terminal or the MU-MC compliant terminal for the sake of convenience. For example, "RTS(L)" indicates that the RTS frame is transmitted to the legacy terminal. "RTS(M)" indicates that the data frame is transmitted to the MU-MC compliant terminal. In this state, the base station transmits the RTS frames to the legacy terminal in channels 1 to 4 (i.e., primary, secondary and secondary 40), while transmitting the RTS frames to the MU-MC compliant terminal in channels 5 to 8 at the same time. If the busy state is detected in channel 2 (primary channel), the legacy terminal does not return the CTS frame in any of channels 1 to 4 as described above. When the MU-MC compliant terminal detects the busy state in channels 5 and 6 and does not detect the busy state in channels 7 and 8 among channels 5 to 8, the CTS frames are returned in channels 7 and 8. In this case, the base station transmits the data frames only in channels 7 and 8 (in this case, the transmission is DL-MU-MC transmission with only one destined terminal). If the RTS frame is destined in channels 1 to 4 for another MU-MC compliant terminal instead of the legacy terminal, the CTS frames can be returned from the MU-MC compliant terminal in channels 1, 3 and 4 even with channel 2 being in the busy state. Consequently, DL-MU-MC transmission can thus be performed in channels 1, 3, 4, 7 and 8 between the two target MU-MC compliant terminals. Accordingly the assumed case where the legacy terminal that performs a static response (or dynamic response) is accommodated and MU-MC communication is performed can cause a problem of reduction in efficiency of channel use.

Figure 6:
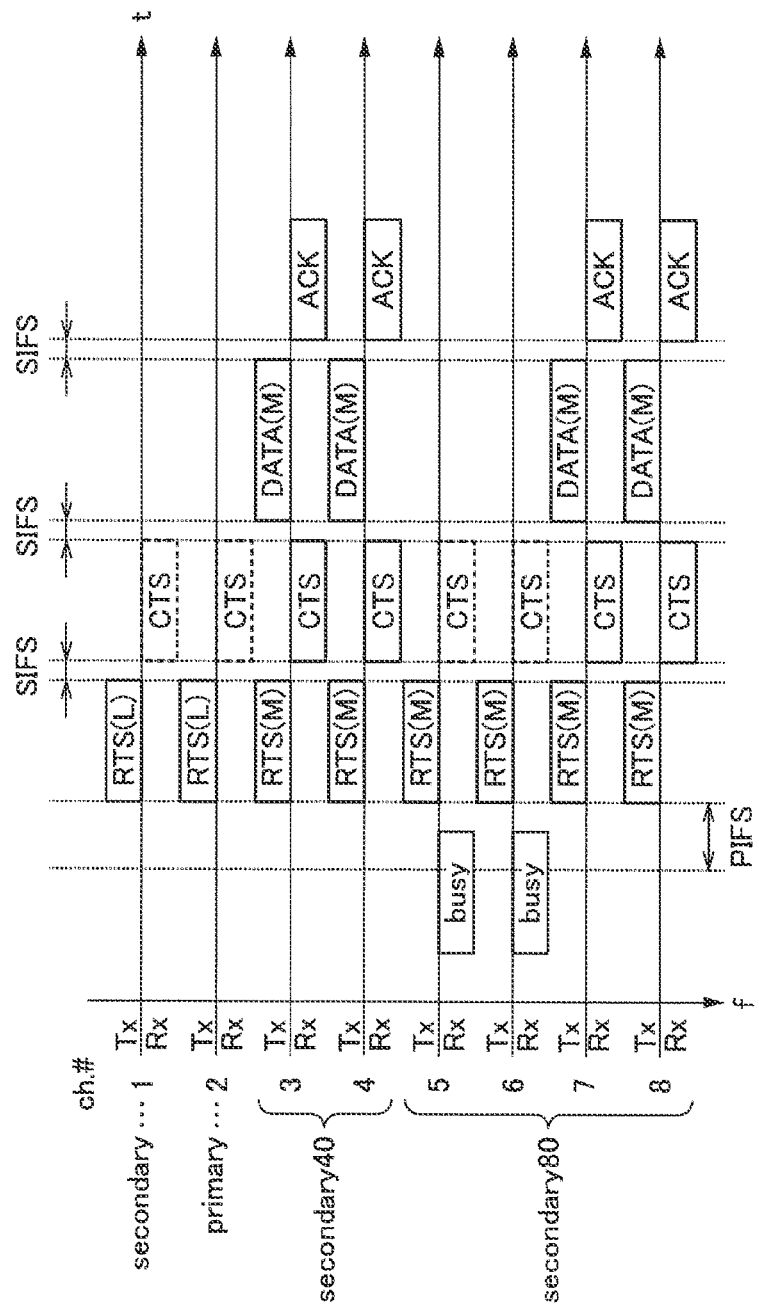
FIG. 6 is a diagram illustrating another operation example in a case where legacy terminals and MU-MC compliant terminals coexist.

FIG. 6 is a diagram illustrating another operation example in a case where the legacy terminal and MU-MC compliant terminal coexist. As with the case of FIG. 5, it is assumed that in the case where the legacy terminal supports channel extension up to secondary 40 (up to 80 MHz channel width) and operates, the RTS frames are transmitted in channels 1 to 2 (primary and secondary) to the legacy terminal that supports IEEE 802.11ac and performs the static operation, and the RTS frames are transmitted to the MU-MC compliant terminal in channels 3 to 8. In this case, for example, when the MU-MC compliant terminal detects the busy state in channels 5 and 6 and does not detect the busy state in channels 3, 4, 7 and 8 among channels 3 to 8, the CTS frames are returned in channels 3, 4, 7 and 8. On the other hand, the legacy terminal recognizes that the channel is extended to secondary 40. Consequently, this terminal detects the busy state in channels 3 and 4 that correspond to secondary 40 due to the RTS frames transmitted to the MU-MC compliant terminal in channels 3 and 4. Consequently, even if the busy state is not detected in channels 1 and 2, no CTS frame is returned in any of channels 1 to 4. Therefore, this case can also cause the problem of reduction in efficiency of channel use.

It is considered that if there is any scheme notifying, as a capability, through an association process, one of the static response and the dynamic response supported by the legacy terminal, for example, the efficiency of channel use may be maintained to be high by not including the statically operating legacy terminal as a target of MU-MC from the beginning. However, in a current state, it is assumed that such a scheme is not provided. Consequently, the base station is required to assume that a legacy terminal performs a static response.

This embodiment allocates a channel width (restricted channel width) narrower than the maximum bandwidth (channel width) supportable by the legacy terminal to the legacy terminal (both types of the static operation terminal and the dynamic operation terminals are targeted), and notifies information on the allocated channel width to the legacy terminal. More generally, information (first information) that designates to the legacy terminal a narrower bandwidth than the maximum available bandwidth extended based on a predetermined channel (reference channel etc.) is transmitted to the legacy terminal (or a wireless communication device mounted thereon) capable of using at least one channel by extending the number of used channels to a designated bandwidth on the basis of the predetermined channel. More specifically, transmission processor 30 generates a management frame that contains the first information, and transmits the management frame. MAC/PHY manager 60 may include a determiner that determines whether to restrict the bandwidth of the legacy terminal at system startup or at another timing, as described later in another embodiment. In a case where the determiner determines to restrict the bandwidth, transmission processor 30 is instructed to transmit information on the restricted bandwidth through MAC common processor 20. Transmission processor 30 generates the management frame that contains the first information, and transmits this management frame. A specific configuration example of the management frame is described later. Here, the determiner that determines whether to restrict the bandwidth is included in MAC/PHY manager 60. Alternatively, another form where reception processor 40 or transmission processor 30 includes the determiner, or a form where the determiner is separately provided as an independent processor may be considered.

Meanwhile, the base station notifies information that identifies multiple channels corresponding to the channel width actually usable for MU-MC communication, to the MU-MC compliant terminal. In this case, the multiple channels notified by the information include at last one channel which has become available due to the bandwidth for the legacy terminal being narrowed. More generally, information (second information) that designates multiple channels containing at least one channel different from the channel used in the bandwidth allocated to the legacy terminal among the multiple channels used in the maximum bandwidth for the legacy terminal is notified to the MU-MC compliant terminal (or a wireless communication device mounted thereon) capable of using at least one or more designated channels. Transmission processor 30 generates the management frame that contains the second information, and transmits this management frame. The second information may be transmitted in the same management frame as the management frame for notifying the first information (information on the restricted bandwidth) described above. Alternatively, a form of transmission in another management frame may be adopted. The MU-MC compliant terminal operates on the basis of the second information between the received first information and second information. This terminal may ignore the first information (however, a form of using the first information may be adopted as described later). The second information is described in a format that cannot be interpreted by the legacy terminal, thereby causing the legacy terminal to operate on the basis of the first information even when receiving the first information and second information. The details are described later.

As described above, the legacy terminal recognizes the restricted bandwidth as the channel width and performs a response. Consequently, reduction in channel efficiency in case of detecting the busy state is significantly suppressed. Therefore, in a case of MU-MC communication with the legacy terminals and the MU-MC compliant terminals coexisting, the system channel efficiency can be maintained to be high while securing a wide channel width for MU-MC communication.

As described above, the first information (the information on the restricted channel width notified to the legacy terminal) and the second information (the information identifying multiple channels to be notified to the MU-MC terminal) are notified in the management frame.

Figure 7:
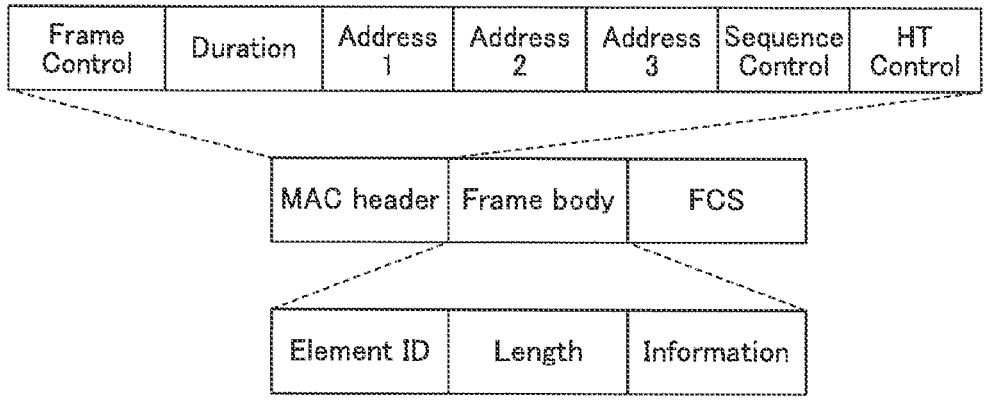
FIG. 7 is a diagram showing a format example of a management frame.

FIG. 7 shows a format example of a management frame. The management frames, such as the beacon frame and probe response frame, have this frame format. This frame format includes MAC header, Frame body field, and FCS field. MAC header includes Frame control field, Duration field, Address fields, Sequence Control field and HT (High Throughput) control field. A frame format that does not include HT Control field and the like may be used. The management frame uses fixed length fields with a predetermined description order with respect to its management frame, as a part of information to be inserted into the Frame body field. The management frame notifies the other information using the format of Information element (IE) where a unique element ID (IDentifier) is assigned. The information element is identified by Element ID, and includes fields which are Element ID field, Length field, and Information field. The Information field stores therein the content of information to be notified. Length field stores therein information on the length of Information field. Frame body field can store therein one or more information elements. Address fields are three fields which are Address 1 field, Address 2 field and Address 3 field. Address 1 field stores therein a Receiver Address (RA). Address 2 field stores therein a Transmitter Address (TA). Address 3 field stores therein a BSSID (Basic Service Set IDentifier) which is the identifier of a BSS (in some cases, all the bits are set to 1 for all the BSSIDs as targets; wildcard BSSID) or a TA, according to the usage of the frame.

IEEE 802.11 defines the HT Operation element as an information element that can notify the channel width to IEEE 802.11n compliant terminal, and VHT Operation element as an information element that can notify the channel width to IEEE 802.11ac compliant terminal through combination with HT Operation element. The first information (information on the restricted channel width notified to the legacy terminal) described above can be notified in the respective Information fields of the HT Operation element and the VHT Operation element.

Figure 8:
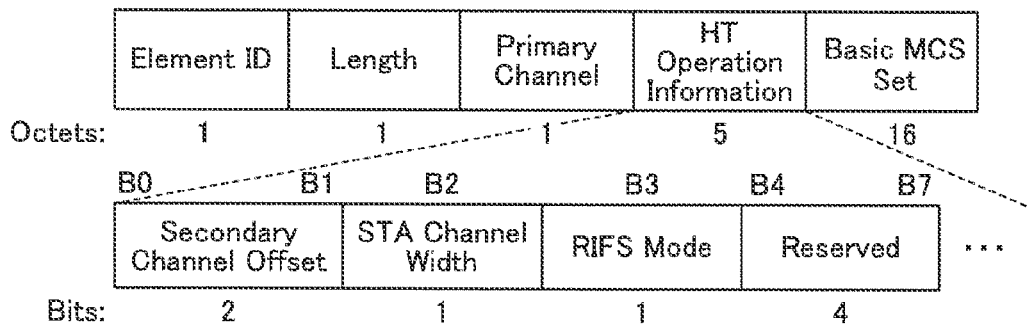
FIG. 8 is a diagram showing a format example of HT Operation Information element.

FIG. 8 shows a format example of an HT Operation element. A value 0 or 1 is set in STA Channel Width subfield (one bit) in HT Operation Information field according to the operation channel width to be used (20 or 40 MHz). A value predefined for the HT Operation element (e.g., 61) is set in the Element ID field. The value of the total size of the information field after the Length field is set in the Length field, and is 22 octets in this example. A channel number of the primary channel is set in Primary Channel field. Secondary Channel Offset subfield (two bits) in the HT Operation Information field indicates a relative offset of the secondary channel with respect to the primary channel. In a case where the secondary channel is set on an upper side (high frequency side) of the primary channel, the value of the subfield is set to one. In a case where the secondary channel is set on a lower side (low frequency side) of the primary channel, the value of the subfield is set to three. In a case with no secondary channel, the value of the subfield is set to zero.

Figure 9:
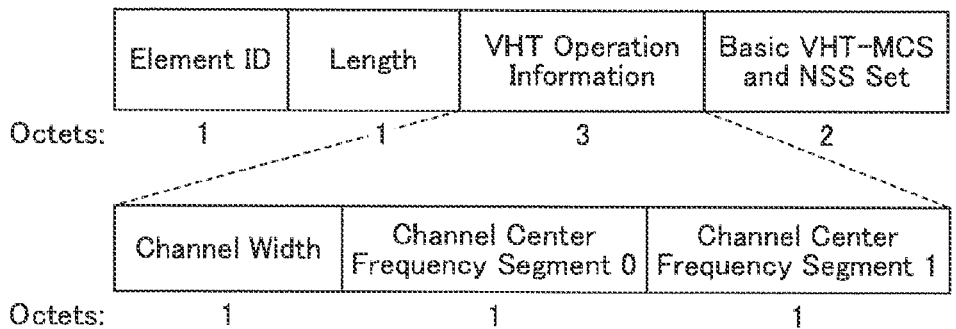
FIG. 9 is a diagram showing a format example of a VHT Operation Information element.

FIG. 9 shows a format example of the VHT Operation element. A value from 0 to 3 is set in the Channel Width subfield (one octet) in the VHT Operation Information field according to the channel width to be used. A value predefined for the VHT Operation element (e.g., 192) is set in Element ID field. The value of the total size of the information field after the Length field is set in the Length field, and is 5 octets in this example.

The value set in the STA Channel Width subfield in the HT Operation element, and the value set in Channel Width subfield in the VHT Operation element in FIG. 8 correspond to the first information (information on the restricted channel width to be notified to the legacy terminal).

FIG. 10 shows a table that represents the relationship among the value set in STA Channel Width subfield in the HT Operation element, the value set in the Channel Width subfield in VHT Operation element, and a channel width. This table is extracted from the specification of IEEE 802.11ac. In IEEE 802.11ac, values from 4 to 255 of the Channel Width subfield in the VHT Operation element are "Reserved".

IEEE 802.11n compliant terminal determines the channel width on the basis of the STA Channel Width subfield. When this value is 0, it is determined as 20 MHz. When this value is 1, it is determined as 40 MHz. IEEE 802.11ac compliant terminal determines the channel width on the basis of the pair of the value of the STA Channel Width subfield and the value of the Channel Width subfield. In a case where (value of the STA Channel Width subfield, value of the Channel Width subfield) is (0,0), it is determined as 20 MHz. In a case of (1,0), it is determined as 40 MHz. In a case of (1,1), it is determined as 80 MHz. In a case of (1,2), it is determined as 160 MHz. In a case of (1,3), it is determined as 80+80 MHz.

In this embodiment, in addition thereto, an MU-MC Operation element is newly defined as an information element for notifying multiple channels for MU-MC communication to the MU-MC compliant terminal. FIG. 11 shows a format example of MU-MC Operation element. In the MU-MC Channel Sets field, which is the new field, information that identifies multiple channels used for MU-MC communication is set. In Element ID field, a value newly defined for the MU-MC Operation element is set. This value may be selected from among values currently unassigned as "Reserved" in IEEE 802.11n and 11ac. Consequently, the MU-MC Operation element can be configured to allow the MU-MC compliant terminal to understand and not to allow the legacy terminal to understand. The value of the total size of the Information field after the Length field is set in the Length field (n octets in this example). MU-MC Operation element can be included, together with the HT Operation element and the VHT Operation element described above, in the same management frame (beacon frame, probe response frame, association response frame, etc.), and be notified to the non-base station.

The MU-MC Operation element, the HT Operation element, and the VHT Operation element correspond to the information elements described with reference to FIG. 7. These three information elements can be stored in the frame body of one management frame in a combined manner as shown in FIG. 12. The order of the description of the information elements in each management frame may be defined. MU-MC Operation element may be transmitted in a management frame different from that for the combination of the HT Operation element and the VHT Operation element.

Here, the format of the MU-MC Channel Sets field in the MU-MC Operation element that notifies, to the MU-MC compliant terminal, information for identifying multiple channels used for MU-MC communication may be not only the format where all the channel numbers used for MU-MC in BSS are simply described in a sequence but also many variations. Some format examples are hereinafter described.

FIGS. 13A and 13B show detailed format examples of the MU-MC Operation element. In the example of FIG. 13A, Minimum Channel Number used for MU-MC communication, and Channel Width Information are stored in the information fields (MU-MC Channel Sets field). For example, in a case where channels that have channel numbers 1 to 8 and are sequentially continuous in the frequency domain are used, it is assumed that the Minimum Channel Number is 1 and the Channel Width Information is 8. The Channel Width Information may be represented by the bandwidth instead of the number of channels. In this case, for example, with the channel width being 20 MHz and the number of channels being 8, the Channel Width Information is set to 160 MHz or the like. The width of one channel may be preset as 20 MHz in the system. Alternatively, a configuration may be adopted where the width of one channel may be separately notified in the management frame. A subfield for defining the width of one channel may be added as a subfield in the information field. Alternatively, information on the width of one channel may be notified in another information element. The relationship between the channel number and the band may be predetermined in the system. Alternatively, a configuration may be adopted where the relationship may be separately notified in the management frame. A subfield for defining the relationship may be added as a subfield in the information field. Alternatively, information on the relationship may be notified in another information element.

In the example of FIG. 13B, the Minimum Channel Number (Lower) and the Maximum Channel Number (Upper) are stored in the information field (MU-MC Channel Sets field). For example, in a case where channels 1 to 8 that have channel numbers 1 to 8 and are sequentially continuous in the frequency domain are used, it is assumed that the Minimum Channel Number is 1 and the Maximum Channel Number is 8. Here, the channel numbers are channel numbers defined for the sake of convenience so as to prevent assumed unit channel widths (e.g., 20 MHz width) from overlapping with each other. Actuality, the channel numbers in wireless LAN are allocated in intervals of 5 MHz. Consequently, for example, in a case where 20 MHz width is used as the unit channel width, where the channel numbers are assumed as those allocated at 5 MHz intervals and where the first channel number is assumed as X, the channel numbers 1 to 8 for convenience have values at intervals each obtained by dividing the assumed channel width by 5 MHz (the value is 4 in a case of the unit channel width of 20 MHz), such as X, X+4, X+8, X+12, X+16, X+20, X+24, and X+28. More specifically, with respect to the defined channel start frequency, the center frequency of each channel is defined as the channel start frequency+5×n_ch (MHz). Here, n_ch is an integer of at least one. In 2.4 GHz band, the channel start frequency is 2407 MHz, and n_ch has any of the values of 1, 2, . . . , 13. In 5 GHz band, the channel start frequency is dot11ChannelStartingFactor×500 kHz, dot11ChannelStartingFactor is any of the values of 8000 to 10000, and n_ch is any of the values of 1, 2, . . . , 200. In this embodiment, the channel numbers for convenience are described in a case without specific description. It is however noted that in a case of replacement with actual channel numbers allocated at 5 MHz intervals, the replacement as described above is made.

In the examples shown in FIGS. 13A and 13B, all the channels to be used are sequential in the frequency domain. In some cases, the channels to be used can be allocated at positions apart from each other in the frequency domain. FIGS. 14A and 14B show format examples in such cases.

In the example of FIG. 14A, multiple sets of the Minimum Channel Number and the Channel Width Information are stored in the information fields in the information elements. For example, in a case of intending to use channels 1 and 2 and channels 5 to 8, the set of the Minimum Channel Number=1 and the Channel Width Information=2 (or 40 MHz), and the set of the Minimum Channel Number=5 and the Channel Width Information=4 (or 80 MHz) are set.

In the example of FIG. 14B, multiple sets of the Minimum Channel Number (Lower) and the Maximum Channel Number (Upper) are stored. For example, in a case of intending to use channels 1 and 2 and channels 5 to 8, the set of the Minimum Channel Number=1 and Maximum Channel Number=2, and the set of the Minimum Channel Number=5 and the Maximum Channel Number=8 are set.

In the formats of FIGS. 14A and 14B, in the Length field, the length according to the number of sets to be set thereafter is designated, thereby allowing the reception side to grasp the number of sets included. FIGS. 14A and 14B show a case where the number of discontinuities is one. Likewise, a case where the number is two or more can conform thereto by increasing the number of sets.

FIGS. 15A and 15B show other detailed format examples of the MU-MC Operation element. It is herein assumed that the channel in which the beacon frame, the probe response frame and the like are transmitted is defined as a system primary channel that is a predefined channel, and format representation is made with the system primary channel being regarded as a base point.

In the format of FIG. 15A, the Channel Width Information field is provided as an information field. For example, in a case where the system primary channel is channel 1 and where channels 1 to 8 are used (one channel has 20 MHz width), the value of Channel Width Information field is eight (the number of all channels). The system primary channel may be excluded from counting. In this case, the value of Channel Width Information field is seven. A subfield for setting the direction of extension to either the high frequency side (upper side) or the low frequency side (lower side) based on the system primary channel may be provided in the Channel Width Information field. In this case, according to the direction, the channels to be used may be identified to be channels as many as the number of channels starting from the system primary channel. In the Channel Width Information field, the value according to the number of channels to be used is set. As described with reference to FIGS. 13A and 13B, the value according to the size of the bandwidth to be used may be set. The case where the system primary channel is included in the channels for MU-MC communication is herein described. Alternatively, the system primary channel may be excluded from the channels for MU-MC communication.

In cases of extension to both of the upper side and lower side in view of the system primary channel, two Channel Width Information fields may be provided as fields 1 and 2 as shown in FIG. 15B. The number of channels to be used continuously in the upper direction from the system primary channel may be defined in one of the predefined fields. The number of channels to be used continuously in the lower direction from the system primary channel may be defined in the other field. A value indicating the upper side and a value indicating the lower side may be set in fields 1 and 2 as subfields. In this case, the correspondence of fields 1 and 2 to the upper and lower sides is not necessarily predefined. In the Channel Width Information fields 1 and 2, the value of the number of channels to be used is set. As described with reference to FIGS. 13A and 13B, the value according to the size of the bandwidth to be used may be set.

FIGS. 16A and 16B show still other detailed format examples of the MU-MC Operation element. In the format of FIG. 16A, the Channel Width Information fields 1 and 2 are provided as the information fields. In the Channel Width Information fields 1 and 2, values are set according to the same definition as that of the STA Channel Width field in the HT Operation element, and the Channel Width field in the VHT Operation element in the table of FIG. 10 described above. For example, in a case where multiple channels corresponding to 80+80 MHz channel width are used, the STA Channel Width field is set to one and the Channel Width field is set to three. Consequently, the value of the Channel Width Information field 1 is set to one and the Channel Width Information field 2 is set to three accordingly. That is, the same values with in a case where the bandwidth corresponds to multiple channels, the STA Channel Width field and the Channel Width field are set in the Channel Width Information field 1 and the Channel Width Information field 2, respectively. The setting has an advantage that allows the table of FIG. 10 to be reused.

The format of FIG. 16B is provided with a Difference Extension Information field. In a case where channels corresponding to the channel width used by the legacy terminal and channels added thereto are used for MU-MC communication, information on the bandwidth corresponding to the added channels is set, as difference information from the channel width used by the legacy station, in this field. For example, in a case where the channel width used by the legacy terminal is only 20 MHz (only primary of channel 2) and where the channel width of 80 MHz (channels 1 to 4) is used for MU-MC communication, the value indicating 60 MHz width, which is the difference, is set. Alternatively, the number of channels, three, corresponding to the difference of 60 MHz may be set. In this case, inclusion of information indicating which frequency direction (upper or lower side) the extension of 60 MHz width is made allows the channel for use to be defined flexibly. It is a matter of course that the channel numbers to be added may be included as the difference. The MU-MC compliant terminal can identify the channel width of the legacy terminal on the basis of the HT Operation element and the VHT Operation element, identify the channel width for the MU-MC communication on the basis of the identified channel width and the value of the Difference Extension Information field, and identify the multiple channels corresponding to the channel width for the MU-MC communication.

FIG. 17 shows still another format example of the MU-MC Operation element. The format of FIG. 17 is provided with the Center Frequency field and the Channel Width Information field as information fields. The index of the center frequency of the multiple channels used for MU-MC communication is set in the Center Frequency field. The value representing the bandwidth corresponding to the multiple channels or the number of these channels is set in the Channel Width Information field.

Thus, referring to FIGS. 13A to 17, some format examples of the MU-MC Operation element have been shown. These examples are only specific examples. It is a matter of course that another method may be used instead. For example, a bit map method may be adopted; this method associates the bits in the MU-MC Operation element with the respective channels, the bit corresponding to the channel to be used is set to 1 while the bit corresponding to the channel not to be used is set to 0. Association of the bits with the channel numbers at intervals of unit channel widths allows the representation method to be efficient. In this case, insertion of the start channel number before the bit map associated with presence or absence of the channel use allows the information on the channels for use to be represented with small redundancy.

Figure 18:
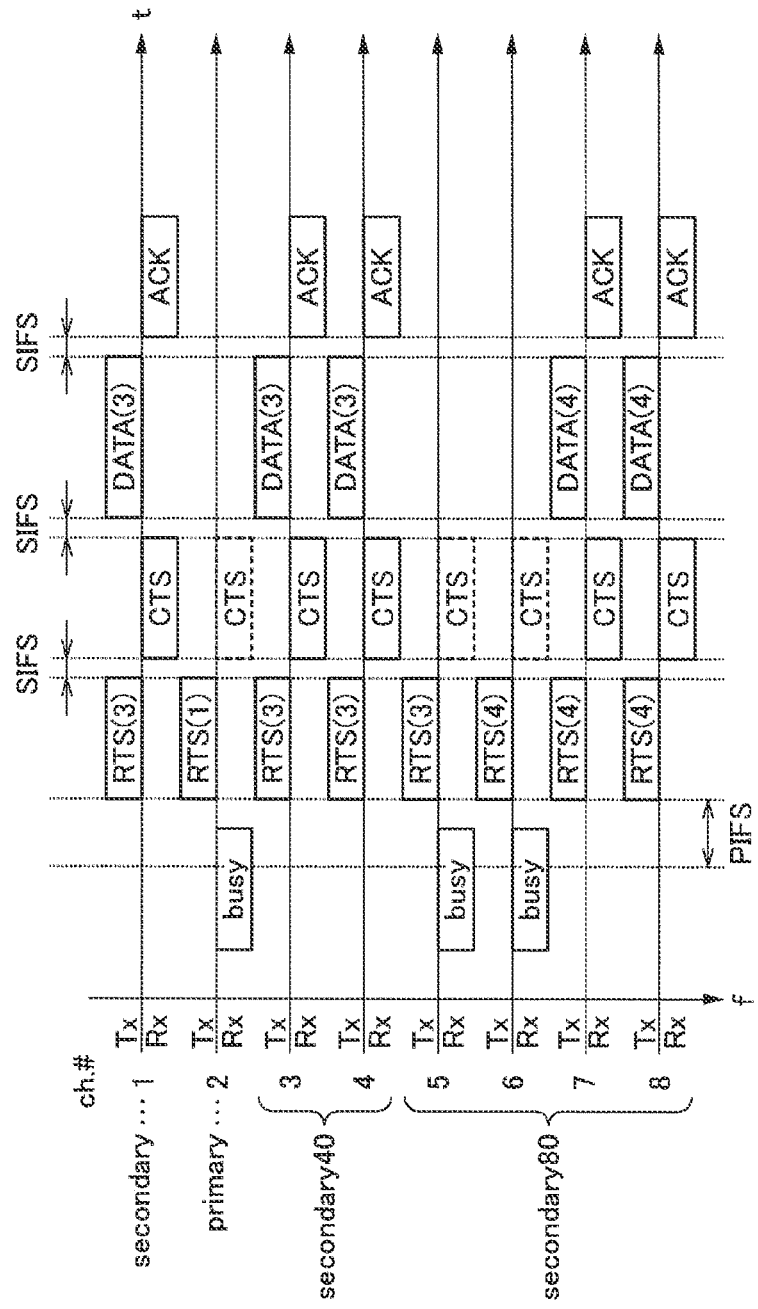
FIG. 18 is a diagram showing an example of an operation sequence according to the embodiment of the present invention.

FIG. 18 is a diagram showing an operation sequence for performing MU-MC communication according to this embodiment. Here, channels with channel numbers (ch. #) 1 to 8 (channels 1 to 8) are present. Channel 2 corresponds to the primary channel, which serves as a reference channel. Channel 1 corresponds to the secondary channel. Channels 3 and 4 correspond to the secondary 40 channel. Channels 5 to 8 correspond to the secondary 80 channel. It is herein assumed that the base station (AP) 100 selects three terminals (STA) 101, 103 and 104, which are non-base stations, as MU-MC communication targets. In FIG. 18, parenthesized numeric such as in representation of "RTS(1)" indicates the lowest digit of the reference number of the destined terminal for the sake of convenience. For example, "RTS (1)" indicates that the RTS frame is transmitted to terminal 101. "DATA(3)" indicates that the data frame is transmitted to terminal 103. In the example of FIG. 18, the number of all channels is eight. However, this embodiment is not limited thereto.

Alternatively, the number of channels may be five, seven or a number larger than eight. The system primary channel may be present for use for announcement or the like. In this case, the system primary channel may be one of these channels (channels 1 to 8) or a channel provided separately from these channels 1 to 8.

It is assumed that terminal 101 is a legacy terminal that performs the static operation, and terminals 103 and 104 are MU-MC compliant terminals according to this embodiment. Base station 100 preliminarily determines the channel width of the legacy terminal as 20 MHz, and the channels for MU-MC communication as channels 1 to 8 (provided that the width of one channel is 20 MHz, eight channels 1 to 8 having 160 MHz channel width are supported). These pieces of information are notified in the management frame as shown in FIG. 12. In a case where terminal 101 that is the legacy terminal having received the management frame supports IEEE 802.11n, the channel width is grasped to be 20 MHz from the HT Operation element (i.e., only channel 2, which is primary channel). In a case where this terminal supports IEEE 802.11ac, the channel width is grasped to be 20 MHz from the HT Operation element and the VHT Operation element (i.e., only channel 2, which is primary channel). Legacy terminal 101 cannot interpret MU-MC Operation element. On the other hand, terminals 103 and 104 recognize that the channels for MU-MC communication are channels 1 to 8 (160 MHz width) based on the MU-MC Operation element (also to the HT Operation element and the VHT Operation element as required).

The base station simultaneously transmits the RTS frame destined for terminal 101 in channel 2, the RTS frames destined for terminal 103 in channels 1 and 3 to 5, and the RTS frames destined for terminal 104 in channels 6 to 8. As described above, the RTS frames to be transmitted to the identical terminal are transmitted as duplicate PPDUs (Physical Layer Convergence Procedure (PLCP) Protocol Data Units) specified in IEEE 802.11n standard and IEEE 802.11ac standard. In this case, it is a matter of course that also on the MAC frame level, the same frames are adopted.

Upon receipt of the RTS frames transmitted from base station 100 in duplicate PPDU, terminals 101, 103 and 104 determine the channels in which the CTS frames can be transmitted in response to the RTS frames. For example, it is confirmed whether CCA is detected to be busy during time period from a time point of starting reception of the RTS frame received as duplicate PPDU to a time point which is a certain fixed time period before the starting time point back. A determination process executed in CSMA/CA for use only in one channel may be used; for example, the determination process is whether the time is in the duration of NAV due to a frame having been received. The certain fixed time period is, for example, PIFS (Point Coordination Function (PCF) InterFrame Space) in IEEE 802.11 standard. This period may be another fixed time period, such as AIFS (Arbitration Interframe Space). The details of AIFS are described in another embodiment described later.

In FIG. 18, in a duration from a time point of starting RTS frame reception to a fixed time period before the starting time point back, CCA is busy in channels 2, 5 and 6 (base station 100 does not detect the busy state of CCA before RTS frame transmission in channels 2, 5 and 6 due to a hidden terminal or the like). Consequently, legacy terminal 101 determines that channel 2 (primary) is in use. MU-MC compliant terminal 103 determines that channel 5 is in use. MU-MC compliant terminal 104 determines that channel 6 is in use. Terminal 101 is a static operation terminal. Consequently, if any of channels used for RTS frame transmission to terminal 101 has interference, no response (CTS frame) is returned. Here, terminal 101 recognizes that only channel 2 (primary) is the operation channel, and channel 2 is detected to be busy. Consequently, no CTS frame is returned (if channel 2 is not detected to be busy, the CTS frame is returned in channel 2). "CTS" encircled by solid line frames represents a CTS frame. "CTS" encircled by broken line frames represents that no CTS frame is transmitted.

Here, if the operation channel of terminal 101 is extended to secondary 40 (in a case of 80 MHz channel wide) and if the RTS frames are transmitted to terminal 101 in channels 1 to 4, detection of the busy state in channel 2 causes the CTS frame not to be returned at all even without detection of busy states in channels 1, 3 and 4 according to the static response. Accordingly, in situations where channel 2 (primary) is detected to be busy as in this example, the channel width of terminal 101 is restricted to 20 MHz width where only channel 2 (primary) is used, thereby allowing reduction in efficiency of channel use to be significantly suppressed in comparison with a case where the channel width has 80 MHz.

Terminal 103 detects the busy state in channel 5 among channels 1, 3 to 5 in which the RTS frames have been transmitted to the own terminal, but does not detect the busy state in channels 1, 3 and 4. Consequently, this terminal returns the CTS frames in channels 1, 3 and 4. That is, unlike legacy terminal 101, MU-MC compliant terminal 103 is not required to perform a response based on the reference channel (primary), detects the busy state independently on a channel-by-channel basis, and returns the CTS frames separately in the channels where no busy state is detected. Consequently, reception processor 40 of terminal 103 outputs an instruction to transmission processor 30 so as to generate the CTS frames only in channels 1, 3 and 4. Transmission processor 30 transmits the CTS frames in channels 1, 3 and 4 SIFS after the time point of completion of receiving the PHY packet that contains the RTS frame. At this time, for example, it is configured such that the time point of completion of receiving the PHY packet that contains the RTS frame is notified together with a CTS frame transmission instruction to transmission processor 30. Thus, transmission processor 30 monitors timing from the time point concerned, and can issue the transmission instruction to PHY processor 50 to cause PHY processor 50 to transmit PPDU containing the CTS frame in the relevant channels (i.e., the channels where the RTS frames destined for the own terminal and no busy state is detected for a fixed time except for a busy state due to reception of the RTS frame) SIFS after the time point.

SIFS is an example. Alternatively, any time or IFS may be adopted only if the time is a fixed time. The time may be IFS, which is longer than SIFS. This is applied to the entire specification. Likewise, another type of IFS, such as DIFS, may be used if the IFS is a fixed time.

Terminal 104 detects the busy state in channel 6 among channels 6 to 8 in which the RTS frames have been transmitted to the own terminal, but does not detect the busy state in channels 7 and 8. Consequently, this terminal returns the CTS frames in channels 7 and 8. That is, as with MU-MC compliant terminal 103, MU-MC compliant terminal 104 detects the busy state independently on a channel-by-channel basis, and returns the CTS frames in individual channels where no busy state is detected. The details of the operation are analogous to those of terminal 103.

Base station 100 receives the CTS frames transmitted from terminal 103 in channels 1, 3 and 4, and receives the CTS frames transmitted from terminal 104 in channels 7 and 8. In channels 2, 5 and 6, no CTS frame can be received. Consequently, it is grasped that channel 2 is determined to be unusable by terminal 101, channel 5 is determined to be unusable by terminal 103, and channel 6 is determined to be unusable by terminal 104. Then, the base station simultaneously transmits the data frames to terminal 103 using channels 1, 3 and 4, and to terminal 104 using channels 7 and 8. That is, the data frames are transmitted through DL-MU-MC transmission to terminals 103 and 104. The data frames destined for terminals 103 and 104 are represented as "DATA(3)" and "DATA(4)", respectively, in the diagram. Base station 100 transmits the data frames SIFS after completion of receiving the CTS frames in channels 1, 3, 4, 7 and 8. Terminal 103 successfully receives the data frames in channels 1, 3 and 4, and transmits ACK frames in channels 1, 3 and 4 SIFS after the data frame reception. Likewise, terminal 104 successfully receives the data frames in channels 7 and 8, and transmits ACK frames in channels 7 and 8 SIFS after the data frame reception. Here, the ACK frames are thus returned on the channel-by-channel basis. Alternatively, the afore-mentioned BA (BlockAck) frame may be returned. Alternatively, each terminal may return the ACK frame or BA frame using one channel of the channels in which the data frame has been received.

In the example of FIG. 18, legacy terminal 101 uses primary channel (channel 2) where 20 MHz width is adopted as the channel width, and channels 1 to 8 are adopted as channels for MU-MC communication. Alternatively, the channels to be used can be deaggregated for the legacy terminals and for MU-MC communication from each other. For example, the legacy terminal adopts primary (channel 2) channel 20 MHz width as the channel to be used. For MU-MC communication, channels 1 and 3 to 8 may be adopted as channels to be used. In this case, in the management frame having the format described above (see FIG. 7), 20 MHz width may be allocated for the legacy terminal, and channels 1 and 3 to 8 may be allocated for the MU-MC compliant terminal.

Figure 19:
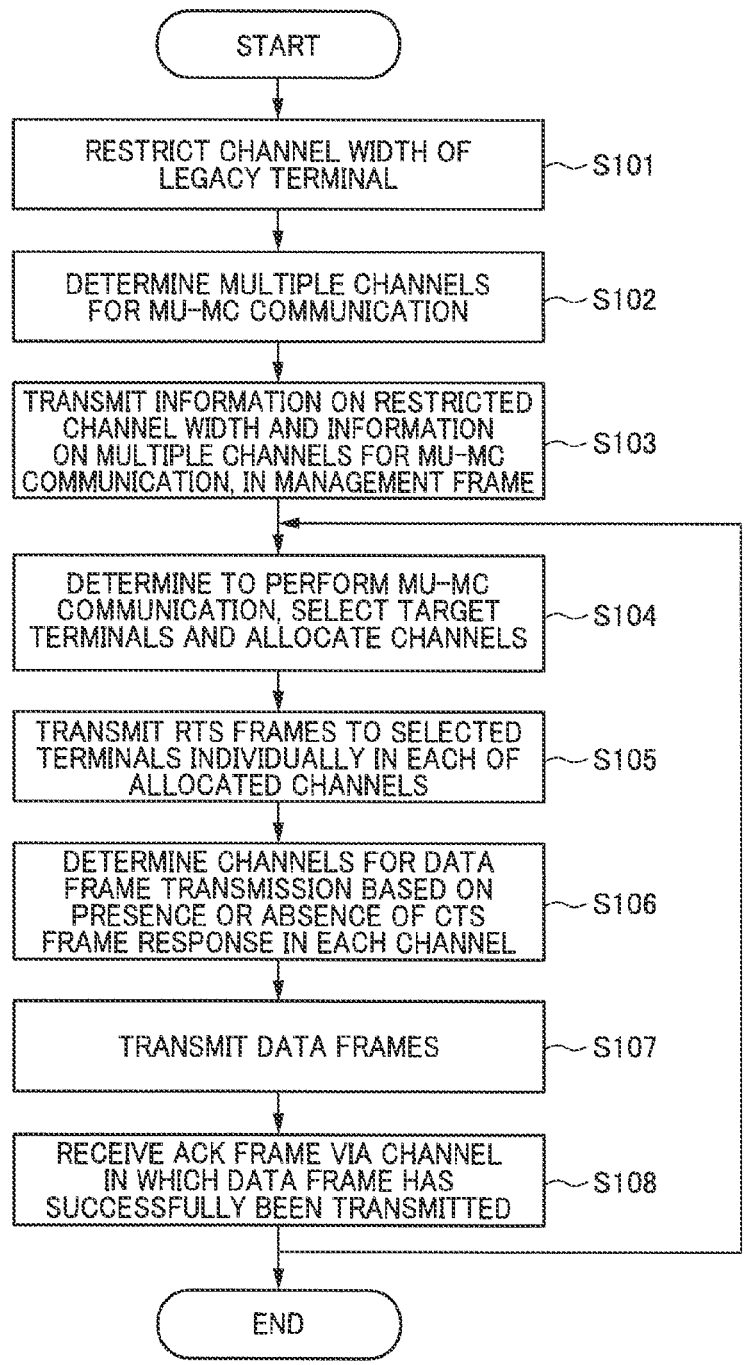
FIG. 19 is a flowchart showing an operation example of the base station according to the embodiment of the present invention.

FIG. 19 is a flowchart of a basic operation example of the base station according to this embodiment. The base station determines to restrict the channel width of the legacy terminals (IEEE 802.11n compliant terminal and IEEE 802.ac compliant terminal) at the time of system startup, at any timing thereafter or at a timing when a predetermined condition is satisfied (the details are illustrated in the embodiment described later) (S101). In order to restrict the channel width, the base station designates a narrower bandwidth than the maximum available bandwidth to the legacy terminal; the maximum available bandwidth is a maximum available bandwidth obtained by extending the channel width based on the predetermined (primary) channel (the same S101). In a case where multiple terminals having different maximum bandwidths are present (e.g., IEEE 802.11n compliant terminal and IEEE 802.ac compliant terminal coexist), the maximum bandwidth of the legacy terminal having the maximum bandwidth that is narrowest among these legacy terminals may be adopted as a reference and a bandwidth narrower than this reference may be allocated. Alternatively, a restricted channel width may be defined as a narrowest channel width, such as 20 MHz channel width, which each legacy terminal can preliminarily support, and the defined channel width may be uniformly applied. In a case where the legacy terminals are only IEEE 802.ac compliant terminals, the channel width may be restricted to 40 MHz channel width. In a case where the legacy terminals are only IEEE 802.11n compliant terminal, the channel width may be restricted to 20 MHz channel width.

The base station determines to allocate multiple channels for MU-MC communication to the MU-MC compliant terminals (S102). Alternatively, the multiple channels for MU-MC communication may be preliminarily determined by the system. For example, the channels may be multiple channels corresponding to the maximum channel width usable by the legacy terminal (e.g., 160 MHz, which is the maximum channel width usable by IEEE 802.11ac). Alternatively, the channels may be a larger number of channels including these channels. It is desired that the channels should be designated so as to include at least the band that becomes available by restricting the channel width of the legacy terminal. Information on the channel width (bandwidth) of the legacy terminal determined in step S101 may be used, and the channels for MU-MC communication may be designated so as not to include the channel corresponding to the channel width concerned. The order of steps S101 and S102 may be inverted.

The base station generates the management frame that contains information (first information) on the restricted channel width determined in step S101 and information (second information) identifying multiple channels for MU-MC communication and determined in step S102, and transmits the management frame (S103). The management frame for transmitting the first information and the second information may be the beacon frame or the probe response frame as described above or another frame. The first information and the second information may be separately transmitted in different management frames.

The base station determines to perform MU-MC communication in response to any trigger (S104). This trigger may be any one. For example, there is a case where transmission data destined for at least two terminals generates. The base station selects multiple terminals that are targets of the MU-MC communication (the same S104). The selected terminals may only be multiple MU-MC terminals, or legacy terminals and MU-MC terminals. In the latter case, the number of the legacy terminal among the terminals is only one. The base station selects and allocates channels for use to the selected terminals (the same S104). In the case of the legacy terminal, channels corresponding to the restricted channel width are selected. For example, in a case of restriction to 20 MHz width, only primary channel (channel 2) is selected. In a case of restriction to 40 MHz, primary channel (channel 2) and secondary channel (channel 1) are selected. For the MU-MC terminal, the channels are selected from among channels other than those selected for the legacy terminal. In a case where the selected terminals are only MU-MC terminals, channels included in the restricted channel width can be allocated to the MU-MC terminals.

The base station simultaneously transmits the RTS frames individually to the terminals selected for the MU-MC communication via respective allocated channels (S105). For RTS frame transmission, it is assumed that a channel access right for one frame is obtained by preliminary carrier sensing on a channel-by-channel basis. The base station simultaneously receives the CTS frames in a channel-by-channel basis from the terminals SIFS after RTS frame transmission, in response to the transmitted RTS frames, thereby obtaining TXOP for subsequent data frame transmission on a channel-by-channel basis, that is, determining the channels for data frame transmission (S106). IF it is determined that continuation of TXOP is inappropriate, such as a case where any CTS frame is not received at all, the processing may return to the point before step S104 or S105. The base station simultaneously transmits the data frames destined for the terminals SIFS after receipt of the CTS frames in the obtained TXOP using the channels in which the terminals have returned the CTS frames (S107). In this case, the base station can not only transmit data frames individually in units of channels, but also transmit the data frame in a band into which two or more channels are bonded, to the identical terminal. In a case where the terminal supports MIMO communication, the data frames can be transmitted in MIMO. In this case, a baseband integrated circuit or a controller also performs processing pertaining to MIMO as a physical layer process.

The base station receives the ACK frame from the terminal having successfully received the data frame via the channel where the data frame has been transmitted SIFS after data frame transmission (S108). As described above, the form where BA (BlockACK) frame is received may be applied. In the same TXOP, the processing may return to step S107, and steps S107 and S108 may be repeated. In this case, step S108 may be omitted, the BAR (BlockAckReq) frame for requesting BA frame transmission may be transmitted at the end of the TXOP, and the BA frame may be received SIFS after the transmission. Alternatively, BA frame transmission (implicit Block Ack Request) may be requested using the ACK policy field in the last transmitted data frame in the TXOP, and the BA frame may be received SIFS after the transmission. To obtain another TXOP, the processing may return from step S108 to step S104.

Figure 20:
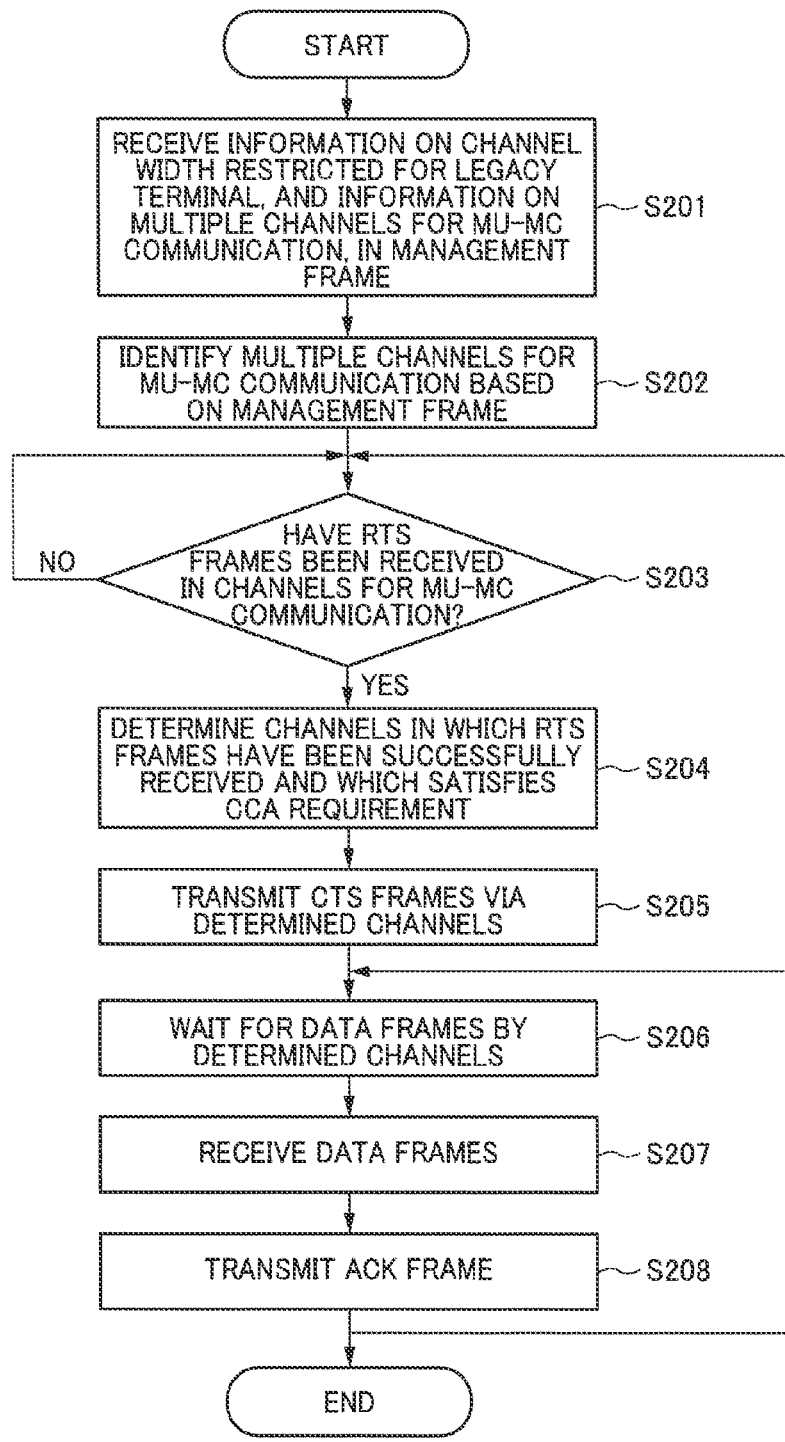
FIG. 20 is a flowchart showing an operation example of the terminal serving as a non-base station according to the embodiment of the present invention.

FIG. 20 is a flowchart of a basic operation example of the MU-MC compliant terminal according to this embodiment. The MU-MC compliant terminal receives the management frame that contains information (first information) on the restricted channel width for the legacy terminal and information (second information) identifying multiple channels for MU-MC communication (S201). The management frame may be the beacon frame or the probe response frame as described above or another frame. The first information and the second information may be separately received in different management frames.

The MU-MC compliant terminal grasps the multiple channels for MU-MC communication on the basis of the second information contained in the management frame. The MU-MC compliant terminal sets a reception filter and a transmission filter so as to allow the signals to be separately received (including CCA detection etc.) in each of the multiple channels, or in each channel set consisting of consecutive channels (S202). In a case where the channel or channel set allocated to the own terminal can be preliminarily grasped among the multiple channels for MU-MC communication, it is only required to be configured so that the signals can be received independently in each of (one or more) the allocated channels or channel sets. In a case where the system primary channel is defined separately from these channels, it is configured so as to allow the signal to be transmitted and received in the system primary channel. It can be considered that the MU-MC compliant terminal basically ignores the first information contained in the management frame. Alternatively, a configuration may be adopted that identifies the multiple channels for MU-MC communication also using the first information as described above.

When the MU-MC compliant terminal determines that the RTS frames are received in some (or all) channels among the channels for MU-MC communication, the terminal checks whether the RTS frame has successfully been received (decoded) on the basis of the FCS information and checks the CCA requirement (whether CCA has not been busy in a fixed time) (S203). The MU-MC compliant terminal determines the channels that successfully received the RTS frames and satisfied the CCA requirement (S204). The CTS frames are simultaneously transmitted in the determined channels SIFS after receipt of the RTS frames (S205). When there is no channel for CTS transmission in S204, the processing returns to step S203. The MU-MC compliant terminal waits for arrival of the data frames in the channels in which the CTS frames have been transmitted (S206). When it is determined that the data frame is received (S207), it is checked whether the data frame is successfully received (decoded) on the basis of the FCS information (S208). In a case of successful reception, data is extracted from the body field of the data frame, and is passed to upper processor 90. ACK frames are generated for the respective channels in which successful reception has been made, the ACK frames are transmitted SIFS after completion of data frame reception (S208). Instead of the ACK frame, the "BlockAck" frame may be generated and transmitted in any channel (or some channels) in which the data frames have successfully been received. In a case where the identical TXOP is continued, the processing returns to step S206. In a case where the received data frame does not require an immediate response, a sequence may be adopted where step S208 after step S207 is eliminated, and the BAR frame is separately received, for example, at the end of TXOP, and the BA frame is transmitted. Alternatively, another sequence where the processing returns to step S203 may be adopted.

As described above, according to this embodiment, as the channel width used by the legacy terminal is restricted, the legacy terminal recognizes the restricted bandwidth as the usable channel width, and performs a response. Consequently, even when there is a channel detected to be busy if the channel width is of the originally supported channel without restriction for use, reduction in channel efficiency, in particular, reduction in channel efficiency in the case where the legacy terminal is a static operation terminal, can be significantly suppressed. Therefore, in a case of MU-MC communication with the legacy terminal and the MU-MC compliant terminals coexist, the system channel efficiency can be maintained to be high while using a wide bandwidth for MU-MC communication.

Second Embodiment

In the first embodiment, it is described that restriction on the channel width of the legacy terminal (IEEE 802.11n and IEEE 802.11ac compliant terminals) maintains the system efficiency of channel use high in MU-MC communication. In this embodiment, a mode is described that determines the necessity of restriction on the channel width of the legacy terminal, and restricts the channel width of the legacy terminal as required.

The base station determines whether to perform the restriction on the channel width of the legacy terminal according to the channel width used for MU-MC communication (or the channel width used in the system). More specifically, it is determined whether to restrict the channel width of the legacy terminal on the basis of the channel width used for MU-MC communication and the channel width that the legacy terminal can support. It can be considered that the timing of determination is the system startup time or any timing thereafter.

Here, in the case of determining at the time of system startup, the channel width that the legacy terminal supports can be determined to be a specific channel width according to the operating band of the base station. For example, in a case where the operating band of the base station is 5 GHz, there is a possibility that both IEEE 802.11n and IEEE 802.11ac compliant terminals are connected to the base station (enter BSS of the base station). In this case, the channel width that the legacy terminal supports may be regarded as 80 MHz that is necessarily supported in IEEE 802.11ac (the channel width may be regarded as 160 MHz in view of possibility of presence of 160 MHz supporting legacy terminal). Provided that the operating band of the base station is 2.4 GHz band, it is understood that there is no IEEE 802.11ac compliant terminal. In this case, 20 MHz, which IEEE 802.11n compliant terminal should necessarily support, may be regarded as the channel width which the legacy terminal supports (in this case, the possibility of presence of a 40 MHz supporting legacy terminal is considered to be low in view of channel allocation taken into account 802.11b compliant terminals in 2.4 GHz band, but the bandwidth may be regarded as 40 MHz in view of possibility of supporting 40 MHz).

For example, a threshold with which the channel width used in MU-MC communication is compared is determined according to the channel width that the legacy terminal supports. In a case where the channel width used for MU-MC communication is at least the threshold, the channel width of the legacy terminal is restricted. For example, in a case where the channel width that the legacy terminal supports is 80 MHz, the threshold is set to 80 MHz. In a case where the channel width for MU-MC communication is at least the threshold, the channel width of the legacy terminal is restricted to 20 MHz, for example. On the other hand, in a case where the channel width for MU-MC communication is less than the threshold, the channel width is not restricted to thereby give precedence to the legacy terminal. In this case, it can be considered that in MU-MC communication, only the MU-MC compliant terminals are selected as the targets of the MU-MC communication.

In a case where the channel width of the legacy terminal is restricted, information pertaining to the restricted channel width may be notified in the management frame, such as the beacon frame or the probe response frame as described in the first embodiment. In a case where the once notified channel width is changed later, a management frame (Channel Switch Announcement frame) or Extended Channel Switch Announcement frame which are described later in a tenth embodiment may be used.

Third Embodiment

In this embodiment, according to instruction information by a user, it is determined whether the channel width to be used by the legacy terminal may be restricted. It can be considered that the user sets the instruction information in conformity with usage of the wireless network group (BSS), for example. For example, in a case where it can be preliminarily expected that the legacy terminals are dominant, information indicating that the channel width is not restricted is set. In a case where it can be expected that the MU-MC compliant terminals are dominant, information indicating that the channel width is restricted is set. For example, the instruction information by the user can be notified to MAC/PHY manager 60 of the base station via MIB (Management Information Base) and MLME (MAC SubLayer Management Entity) SAP (Service Access Point).

For example, it is assumed that the instruction information by the user is information that restricts the channel width of the legacy terminal to 20 MHz. In this case, the base station sets the channel width of the legacy terminal to 20 MHz according to the instruction information. It can be considered the timing for determining whether the channel width may be restricted is basically the system startup time. Alternatively, a configuration may be adopted that the user provides instruction information after system startup, and the information is reflected.

As described above, in a case where the channel width of the legacy terminal is restricted, information pertaining to the restricted channel width may be notified in the management frame, such as the beacon frame or the probe response frame, as described in the first embodiment. In a case where the channel width having once been notified is changed later, the management frame having the format described in the tenth embodiment may be used, as described above.

The instruction information by the user may be stored in a storage provided in the base station and read at the startup of the base station. Alternatively, the user may provide the instruction information, through an application screen for setting, from an apparatus connected to the base station via a network. The network may be a network which forms BSS as described above, or a network other than this network.

Fourth Embodiment

In the second and third embodiments, it is determined whether the channel width of the legacy terminal may be restricted, at the system startup time or any timing. In this embodiment, when the base station enables (turns on) the function of the MU-MC communication, the base station restricts the channel width of the legacy terminal. In the second and third embodiments, it is assumed that the function of MU-MC communication is on from the system start up. In this embodiment, the function of MU-MC communication is disabled (off) at the startup or in the midstream after startup. Subsequently, when the function of MU-MC communication is turned on, the channel width of the legacy terminal is restricted. Setting on and off of the function of MU-MC communication may be performed through MIB, for example.

It can be considered that cases where the function of MU-MC communication is turned on after system startup include, for example, a case of detection that the network (BSS) of the base station is congested in traffic, a case of detection that the amount of data for communication is large, and a case of detection that short frame transmission is dominant. The case where the network is congested in traffic can be determined on the basis of the number or ratio of times of failure in ACK frame reception. The whether the amount of data in communication is large or not can be determined according to whether the total amount of data transmitted to the terminals is larger than a predetermined value, for example. As to the case where short frame transmission is dominant, the number of MAC frames (MPDU) exchanged with the individual terminals is counted, or to further precisely grasp the number, the number of MSDUs shorter than a predetermined value (the number may be simply the number of MPDUs shorter than a predetermined value) is counted. When the total or average of the count values per unit time is large, it can be determined that short frame transmission is dominant. These determination methods are only examples. Alternatively, any method may be used only if the method can determine the analogous situations.

When the base station determines to turn on the function of MU-MC communication, the base station sets the enablement of the function of MU-MC communication in MIB, and may notify the enablement of the function of MU-MC communication to the MU-MC compliant terminals belonging to BSS through the management frame, as required. Furthermore, it is determined that the channel width of the legacy terminal is restricted, information pertaining to the restricted channel width may be notified through the management frame. The restricted channel width may be preliminarily set to 20 MHz or the like. The restricted channel width may be controlled according to the type of present legacy terminals as follows. In a case where IEEE 802.11n and IEEE 802.11ac compliant terminals coexist, the channel width is 20 MHz. In a case where only IEEE 802.11ac compliant terminals are present, the channel width is 40 MHz. In a case where the channel width having once been notified is changed later, the management frame described in the tenth embodiment may be used as described above.

As described above, according to this embodiment, when the base station enables (turns on) the function of MU-MC communication, the channel width of the legacy terminal is restricted. Thereby, in a situation where no MU-MC communication cannot be performed, restriction on the communication of the legacy terminal can be prevented.

Fifth Embodiment

The base station determines whether the channel width of the legacy terminal may be restricted, on the basis of the relationship of interference with another system, such as BSS of another base station whose communication area overlaps. For example, upon determination that the MU-MC communication efficiency decreases, the base station determines to restrict the channel width of the legacy terminal belonging to this base station. BSS of another base station that overlaps therewith is sometimes called OBSS (Overlapping BSS).

More specifically, the base station scans the channels used for the system or the channels used for MU-MC communication. In particular, the channels corresponding to the channel width that the legacy terminal supports are scanned. For example, the channels may be scanned at the system startup time, or at timing when the function of MU-MC communication is turned on in the case where the function of MU-MC communication is turned on after system startup, or at another freely selected timing.

The busy rate of the channel scanning is measured. It is determined whether the channel width may be restricted according to the busy rate. The busy rate may be measured according to a ratio of the time period determined to be busy to the time period during which carrier sensing is performed, for example. Alternatively, the busy rate may be measured according to another method defined. In a case where the busy rate exceeds a predetermined value in one of the channels corresponding to the channel width that the legacy terminal supports, it may be determined to restrict the channel width. In the other cases, it may be determined that restriction is not required. Alternatively, it may be determined to restrict the channel width in a case where the busy rate exceeds the predetermined value in all or at least a certain number of channels. In the other cases, it may be determined that restriction is not required. The restricted channel width may be preliminarily set to 20 MHz or the like. The restricted channel width may be controlled according to the type of present legacy terminals as follows. In a case where IEEE 802.11n and IEEE 802.11ac compliant terminals coexist, the channel width is 20 MHz. In a case where only IEEE 802.11ac compliant terminals are present, the channel width is 40 MHz.

As described above, according to this embodiment, the channel width of the legacy terminal is restricted in a case of high channel interference with another system (in a case of a high busy rate), and thereby the effect on the legacy terminal can be reduced even though the channel width of the legacy terminal is restricted. Consequently, MU-MC communication having high efficiency of channel use can be achieved without substantial large limitation on legacy terminal communication.

Sixth Embodiment

The base station determines whether the channel width of the legacy terminal may be restricted, on the basis of the usage frequency of channel used by the legacy terminal (primary channel, secondary channel, secondary 40 channel or the like). The channel usage frequency may be measured by any method only if it can be evaluated how many times or how long the channel is used. For example, the ratio (usage rate) of the time period during which radio wave intensity having at least a certain level is received in the channel, the ratio (busy rate) of the busy time period and the like can be used. In actuality, one or more channels used for transmission by each legacy terminal may be grasped and then a statistical process and the like may be performed to calculate the usage rate.

For example, when the usage rate of primary channel is at least a predetermined value, it may be judged that many legacy terminals are present in BSS and it may be determined not to restrict the channel width. When this rate is less than the predetermined value, it may be judged that the number of legacy terminals is small and it may be determined to restrict the channel width to 20 MHz. In this case, the MU-MC compliant terminal controls transmission not to be performed in primary channel, thereby allowing the measurement accuracy to be further improved. The usage rate may be measured at every predetermined time, and an analogous determination may be performed on the basis of the average of previous X (X is an integer at least two) measurements. When the usage rates of Y measurements (Y is a value at least one and less than X) among previous X measurements are at least a predetermined value, it may be determined not to restrict the channel width. Instead of the method described above, any method may be used only if the number of legacy terminals can be substantially evaluated on the basis of the usage rate.

It may be determined whether the channel width of the legacy terminal may be restricted, on the basis of the relationship between the number of legacy terminals belonging to BSS and the number of MU-MC compliant terminals belonging to this BSS. For example, in a case where the value obtained by subtracting the number of MU-MC compliant terminals from the number of legacy terminals is at least a predetermined value (e.g., the predetermined value is any of integers ranging also to negative values), the channel width is not restricted. In a case this difference is less than the predetermined value, the channel width may be restricted. Alternatively, the value may be obtained by dividing the number of legacy terminals by the number of MU-MC compliant terminals (in this case, the predetermined value may be any integer at least zero, for example). The number of legacy terminals and the number of MU-MC compliant terminals may be measured at every predetermined time, and analogous determination may be performed on the basis of the average of differences for previous X times. When the differences for Y measurements (Y is a value at least one and less than X) among previous X measurements are at least a predetermined value, it may be determined not to restrict the channel width. Instead of the method described above, any method may be used only if the relationship between the number of legacy terminals and the number of MU-MC compliant terminals can be evaluated. Here, the legacy terminal is not discriminated between IEEE 802.11n and IEEE 802.11ac. Alternatively, only the number of IEEE 802.11ac compliant terminals may be used as the number of legacy terminals. This is because the effect of IEEE 802.11ac compliant terminal having a possibility of using a wider band is greatly considered (even with same number of legacy terminals, the more the number of IEEE 802.11ac compliant terminals is, the more great reduction in system channel efficiency is concerned).

As described above, according to this embodiment, in a case where the number of legacy terminals is small or considered to be small, the channel width of the legacy terminal is restricted. On the contrary, in a case where the number is large or considered to be large, the restriction is not performed. This allows the channel width to be restricted in a state where the effect on the legacy terminal is small.

Seventh Embodiment

The base station may determine for MU-MC communication whether the channel width of the legacy terminal may be restricted according to the channel access frequency in TXOP obtained for RTS frame transmission. For example, the channel access frequency may be a channel access rate: a ratio at which transmission have succeeded in each of the multiple channels intended for MU-MC communication as a result of actual carrier sensing in each of the channels to be accessed in the MU-MC. For example, the channel access rate is calculated on the channels used by the legacy terminal, for example, four 20 MHz-unit channels from primary channel to secondary 40 channel (channels 1 to 4). In a case of presence of a channel having a channel access rate lower than a predetermined value, it may be determined to restrict the channel width of the legacy terminal to 20 MHz or the like. Instead of the channel access rate, the number of continuous failures in obtaining the transmission right may be used as the channel access frequency. Here, the channel width may be restricted in the case of a predetermined number of continuous failures in obtainment. Alternatively, an indicator other than the indicators herein described may be used as the channel access frequency.

According to MU-MC usage frequency in a case of channel access for MU-MC communication, it may be determined whether the channel width of the legacy terminal is restricted. More specifically, as the MU-MC usage frequency, with respect to each of the channels in which the RTS frames have been transmitted, a ratio of channels where the CTS frames have been returned (actual TXOP acquisition rate to channel accesses) can be used and the ratio corresponds to a MU-MC usage ratio. For example, the MU-MC usage rate is calculated on the channels used by the legacy terminal, for example, four 20 MHz-unit channels from primary channel to secondary 40 channel. In a case of presence of a channel having a MU-MC usage rate lower than a predetermined value, it is determined to restrict the channel width of the legacy terminal to 20 MHz or the like. The MU-MC usage rate, which is the ratio that the CTS frames have been returned, is herein used as the MU-MC usage frequency. Another indicator may be used as long as it can evaluate to which extent the channels used for RTS frame transmission have been actually used for MU-MC communication. For example, the indicator may be the success rate of data frame transmission after CTS frame transmission (the ratio of successful receipt of ACK) or the failure rate. In a case of presence of a channel which is used by the legacy terminal and has a success rate less than a predetermined value or a failure rate at least a predetermined value, it may be determined to restrict the channel width of the legacy terminal to 20 MHz or the like.

As described above, according to this embodiment, when the channel access frequency or MU-MC usage frequency is low, the channel width of the legacy terminal is restricted, and thereby the effect on the legacy terminal can be reduced even though the channel width of the legacy terminal is restricted. Consequently, MU-MC communication having high efficiency of channel use can be achieved without substantial large limitation on legacy terminal communication.

Eighth Embodiment

A little unlike restriction of the channel width of the legacy terminal as described above, this embodiment is characterized in that the legacy terminal is not connected to the base station at first. The legacy terminal is not allowed to belong to BSS at first, thereby causing BSS to include basically only MU-MC compliant terminals. The system channel efficiency can thus be maintained high.

To prevent the legacy terminal from being connected to the base station, the base station is only required to set information indicating connection denial in the association response frame, which is a response to the association request frame received from the legacy terminal in an association process. IEEE 802.11 standard indicates connection denial using a status code. The status code is represented by a numeric value, and may be any existing value, for example. For example, the existing status code that can be used is as follows. The code may be "1" that has meaning of unspecified failure and indicates "REFUSED" or "REFUSED_REASON_UNSPECIFIED", "10" that has meaning that it cannot support all requested capabilities in Capability Information field and indicates "REFUSED_CAPABILITIES_MISMATCH", "12" that has meaning of association denied due to reason outside the scope of this standard, "17" that has meaning of association denied because AP is unable to handle additional associated STAs, and 37" that has meaning that the request has been declined. A number selected from among numeric values currently unassigned and "Reserved" may be defined as connection denial that explicitly indicates an effect of this embodiment. The reason for clear indication may be, for example, "REFUSED" due to not supporting the MU-MC function, "REFUSED" due to not satisfying the carrier sensing requirement or the like. The legacy terminal may be configured so that the terminal can understand the status code through firmware updating or the like. The legacy terminal reads and analyzes the status code from the association response frame received from the base station, thereby allowing this terminal to recognize explicitly the fact of connection denial to the own terminal. Clear notification on connection denial through the status code can subsequently prevent the system efficiency from being caused by repeated transmission of the association request frame from the legacy terminal.

Here, the association response frame is used to notify connection denial to the legacy terminal. Thus, the connectivity policy can be changed between IEEE 802.11n and IEEE 802.11ac. For example, connection of the terminal in conformity with one of IEEE 802.11n and IEEE 802.11ac may be denied, while connection of the terminal in conformity with the other standard may be allowed. Connection denial "Refused" to the legacy terminal may be preliminarily notified in the beacon frame or the probe response frame transmitted from the base station. This notification can prevent the association request frame from being transmitted from the legacy terminal at start. For example, "BSS membership selector" is used, in Supported Rates element or Extended Supported Rates element to be contained in the beacon frame or the probe response frame, to restrict IEEE 802.11n terminal or restrict both IEEE 802.11n terminal and IEEE 802.11ac terminal.

Not only denial to the connection of the legacy terminal at first (in the association process), but also a scheme can be adopted that permits connection at first and disconnects in the midstream. To disconnect the legacy terminal, the base station transmits a disconnection frame. Information indicating disconnection may be set in the disconnection frame. In IEEE 802.11 standard, with respect to the status code of the association response frame, the disconnection frame indicates the reason of disconnection using a reason code in the disconnection frame. As with the status code, an existing value may be used as the number of the reason code. For example, the existing reason code that can be used is as follows. The code may be "1" that has meaning of unspecified reason, "5" that has meaning that it is disassociated because AP is unable to handle all currently associated STAs, "32" that has meaning that it is disassociated for unspecified (QoS-related reason) because of a reason pertaining to unspecified QoS (Quality of Service), and "33" that has meaning that it is disassociated because QoS AP (base station) lacks sufficient bandwidth for this QoS STA (terminal). A number selected from among numeric values currently unassigned as "Reserved" may be defined as disconnection that indicates the gist of this embodiment. The reason for clear indication may be, for example, disconnection due to not supporting the MU-MC function, disconnection due to not satisfying the carrier sensing requirement or the like. The legacy terminal reads and analyzes the reason code from the disconnection frame received from the base station, thereby allowing this terminal to recognize explicitly the fact of disconnection to the own terminal. Clear notification on disconnection through the reason code can subsequently prevent reduction in system efficiency from being caused by another transmission of the association request frame from the legacy terminal. The timing of determining disconnection of the legacy terminal may be timing in response to turning on the function of MU-MC communication as described above. The timing may be timing when it is detected that BSS is congested in traffic, a large amount of data is exchanged, or exchange of many frames occurs, also as described above. Alternatively, in a case where only the legacy terminals in BSS of the base station belong at first, the timing may be timing when a predetermined number of, one or multiple, MU-MC compliant terminals newly enter this BSS.

Ninth Embodiment

In the second to eighth embodiments, the cases of restricting the channel width of the legacy terminal or denying connection (or disconnecting) to the base station are described. On the contrary, the restriction on the channel width may be canceled, or the connection to the base station may be permitted. The criterion of determination in this case may be a criterion inverted to that for determining restriction or denial (or disconnection) in the second to eight embodiments. That is, when the ground for determination in the second to eighth embodiments is eliminated, the restriction on the channel width may be canceled or connection to the base station may be permitted. When the restriction on the channel width is canceled, the information on the channel width after the cancellation may be notified in a frame in the tenth embodiment described later, or the management frame, such as the beacon frame. Examples of canceling the restriction on the channel width include a case of return to 40 MHz channel width after restriction to 20 MHz channel width, and change to 80 MHz channel width after restriction to 40 MHz channel width. Information on the channel width after cancellation corresponds to third information that is wider than the channel width before cancellation and equal to or less than the channel width that can be supported. In a case where connection to the base station is permitted, setting provided in the beacon frame or the probe response frame in order to deny the connection of the legacy terminal may be canceled and the frame notifying the cancelation of the setting may be transmitted. Subsequently, upon receipt of a transmission request issued by the legacy terminal, the base station may permit the connection.

Tenth Embodiment

In the second to ninth embodiments, not only the case at the system startup but also the case of restricting (or canceling the restriction of) the channel width of the legacy terminal in the midstream is described. An example of a frame used for restricting (or canceling the restriction of) the channel width in the midstream is described. For example, Channel Switch Announcement frame or Extended Channel Switch Announcement frame may be used.

Figures 21A, 21B, 22:
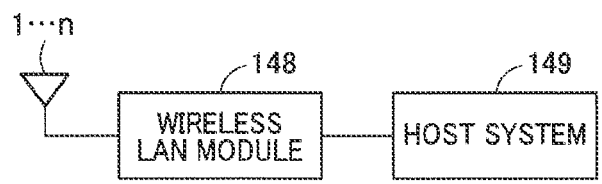
FIG. 21A is a diagram showing a format example of "Secondary Channel Offset" element.
FIG. 21B is a diagram showing a format example of a "Wide Bandwidth Channel Switch" element.
FIG. 22 is a diagram showing an overall configuration example of the terminal or the base station.

In the case of using Channel Switch Announcement frame, it is only required to set a value according to the changed channel width in Secondary Channel Offset field in Secondary Channel Offset element in Channel Switch Announcement frame. FIG. 21A shows an example of a format of Secondary Channel Offset element. The position of secondary channel with respect to primary channel is designated in "Secondary Channel Offset" subfield in Secondary Channel Offset element. For example, in a case where the channel width is changed from 20 MHz to 40 MHz or a wider channel width and where secondary channel is provided on the upper side (high frequency side) of primary channel, the value of this field is set to 1; in a case where secondary channel is provided on the lower side (low frequency side), the value of this field is set to 3. In a case where the channel width is changed from 40 MHz or a wider channel width to 20 MHz, the value of this field is set to zero. In a case where the channel width is changed to that wider than 40 MHz width Bandwidth Channel Switch element is additionally used. FIG. 21B shows an example of a format of Wide Bandwidth Channel Switch element. Two fields in Wide Bandwidth Channel Switch element, which are New Channel Width field and New Channel Center Frequency Segment 0 field, are used, or three fields containing New Channel Center Frequency Segment 1 field added to the two fields are used. The changed channel width is designated in New Channel Width field. For example, in a case of 80 MHz, 1 is set. In a case of 160 MHz, 2 is set. In a case where 80+80 MHz, 3 is set. The index of the center frequency in a case where the changed channel width is 80 or 160 MHz is set in New Channel Center Frequency Segment 0 field. In a case where the changed channel width is 80+80 MHz, the index of the center frequency of one of the two 80 MHz (segment 0) including primary channel is set in New Channel Center Frequency Segment 0 field. The index of the center frequency of the other 80 MHz (segment 1) not including primary channel is set in New Channel Center Frequency Segment 1 field.

Instead of Channel Switch Announcement frame, Extended Channel Switch Announcement frame may be used. In this case, the channel width is changed, using New Operating Class field in Extended Channel Switch Announcement frame. When the channel width is changed to that wider than 40 MHz width Bandwidth Channel Switch element is used. Operating Class is defined so that it can be identified whether the channel interval is 20 or 40 MHz width. The value of Operating Class is set in New Operating Class field. Consequently, in New Operating Class field, change from 20 to 40 MHz or to a channel width wider than 40 MHz can be notified, and change from 40 MHz or a channel width wider than 40 MHz to 20 MHz can be notified. These frame elements may be stored in the beacon or probe response frame. Consequently, the beacon or probe response frame may be used as a method to restrict the channel width in the midstream.

Eleventh Embodiment

In the first embodiment, the newly defined MU-MC Operation element (see FIGS. 11 and 13 to 17) is used in order to notify multiple channels used for MU-MC communication. Alternatively, VHT Operation element (see FIG. 9) may be used in a diverted manner. In this case, the value of Channel Width subfield (1 octet) of VHT Operation element is set to a value (4 to 255) currently unassigned and "Reserved" (as shown in FIG. 10, currently a value from 0 to 3 is used). Through setting the unassigned value, IEEE 802.11ac compliant terminal cannot analyze Channel Width subfield. Consequently, the operation becomes that on IEEE 802.11n level. More specifically, IEEE 802.11ac compliant terminal operates according to HT Operation element (see FIG. 8). That is, the channel width to be used in IEEE 802.11ac compliant terminal can be restricted to 20 or 40 MHz. Use of VHT Operation element achieves an advantage of negating the need to define a new information element, such as MU-MC Operation element.

Currently, among the unassigned values (4 to 255) in Channel Width subfield, for example, 4 can be defined to indicate 80 MHz channel width (four continuous channels 20 MHz width), 5 can be defined to indicate 160 MHz channel width (eight continuous channels 20 MHz width) and the like. At this time, numerics 4 and 5 may be represented using three bits (e.g., lower three bits) of one octet, while an index representing the center frequency may be set in the remaining five bits.

Alternatively, for example, some or all numerics from 4 to 255 are each associated with multiple channels for use and preliminarily stored in the base station and each terminal in a form of a table or the like. For example, a numeric 4 is associated with the channels 1 to 4, a numeric 5 is associated with channels 1 to 8, a numeric 6 is associated with channels 9 to 16, and a numeric 7 is associated with channels 1 to 4 and channels 9 to 13. The numeric corresponding to multiple channels for use is set in Channel Width subfield. Although information on the table or the like is required to be preliminarily prepared, this setting can designate a wider variety of channels for use in a shorter subfield.

In the two examples described above, the representation is made using only Channel Width subfield. Alternatively, a method of additionally using Channel Center Frequency Segment 0 subfield and Channel Center Frequency Segment 1 subfield may be adopted. A method of using Channel Center Frequency Segment 0 subfield and Channel Center Frequency Segment 1 subfield is the same as the aforementioned description. Only analysis of Channel Width subfield is newly defined. For example, among 4 to 255, a numeric 4 is defined to indicate 80 MHz channel width, a numeric 5 is defined to indicate 160 MHz, and a numeric 6 is defined to indicate 80+80 MHz channel width. Thus, without largely changing the method of interpreting VHT Operation element, multiple channels used for MU-MC communication can be notified. Current VHT Operation element can only represent up to two segments (a continuous segment of channels).

However, provided that the legacy terminal that supports IEEE 802.11ac is expected to allow the Length value to be at least five, Segment 3, Segment 4, . . . can be added after Basic VHT-MCS and NSS set field in FIG. 9, as required, for example, and three or more segments can be used, thereby allowing flexible channel use.

Besides the method described here, various subfields (Channel Width, Channel Center Frequency Segment 0 and Channel Center Frequency Segment 1) can be used only if multiple channels used for MU-MC communication can be notified using VHT Operation element.

Twelfth Embodiment

FIG. 22 shows an example of entire configuration of a terminal or a base station. The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication device according to the first embodiment. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external apparatuses according to an arbitrary communication protocol. The communication protocol may include the TCP/IP and a protocol of a layer higher than that. Alternatively, the TCP/IP may be mounted on the wireless LAN module 148, and the host system 149 may execute only a protocol in a layer higher than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, a hand-held device, and so on.

Figure 23:
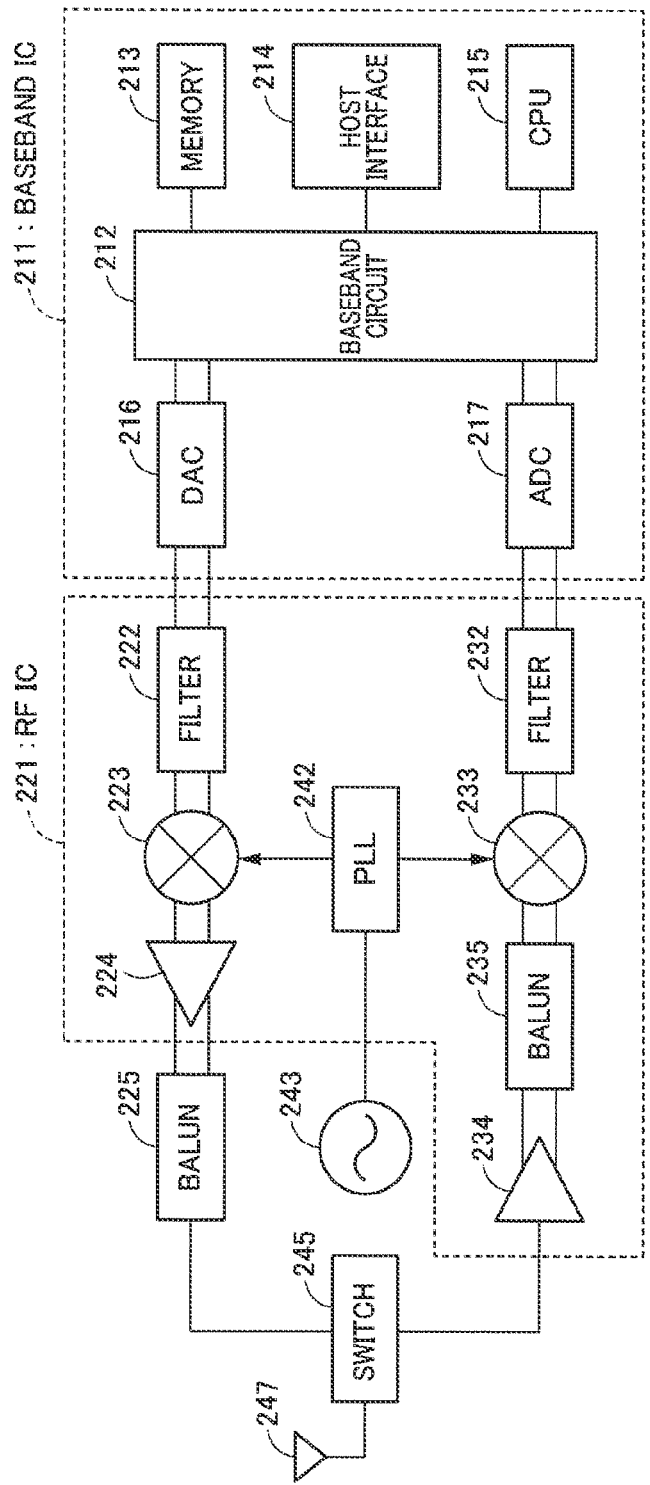
FIG. 23 is a diagram showing a hardware configuration example of a wireless communication device mounted on the base station or the terminal.

FIG. 23 shows an example of hardware configuration of a wireless LAN module. The configuration can also be applied when the wireless communication device is mounted on either one of the terminal that is a non-base station and the base station. Therefore, the configuration can be applied as an example of specific configuration of the wireless communication device shown in FIG. 1. At least one antenna 247 is included in the example of configuration; however, two or more antennas may be included. When a plurality of antennas are included, a plurality of sets of a transmission system (216 and 222 to 225), a reception system (232 to 235), a PLL 242, a crystal oscillator (reference signal source) 243, and a switch 245 may be arranged according to the antennas, and each set may be connected to a control circuit 212. One or both of the PLL 242 and the crystal oscillator 243 correspond to an oscillator according to the present embodiment.

The wireless LAN module (wireless communication device) includes a baseband IC (Integrated Circuit) 211, an RF (Radio Frequency) IC 221, a balun 225, the switch 245, and the antenna 247.

The baseband IC 211 includes the baseband circuit (control circuit) 212, a memory 213, a host interface 214, a CPU 215, a DAC (Digital to Analog Converter) 216, and an ADC (Analog to Digital Converter) 217.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 stores data to be transferred to and from the host system. The memory 213 also stores one or both of information to be transmitted to the terminal or the base station and information transmitted from the terminal or the base station. The memory 213 may also store a program necessary for the execution of the CPU 215 and may be used as a work area for the CPU 215 to execute the program. The memory 213 may be a volatile memory, such as an SRAM or a DRAM, or may be a non-volatile memory, such as a NAND or an MRAM.

The host interface 214 is an interface for connection to the host system. The interface can be anything, such as UART, SPI, SDIO, USB, or PCI Express.

The CPU 215 is a processor that executes a program to control the baseband circuit 212. The baseband circuit 212 mainly executes a process of the MAC layer and a process of the physical layer. One or both of the baseband circuit 212 and the CPU 215 correspond to the communication control apparatus that controls communication or the controller that controls communication.

At least one of the baseband circuit 212 or the CPU 215 may include a clock generator that generates a clock and may manage internal time by the clock generated by the clock generator.

For the process of the physical layer, the baseband circuit 212 performs addition of the physical header, coding, encryption, modulation process, and the like of the frame to be transmitted and generates, for example, two types of digital baseband signals (hereinafter, "digital I signal" and "digital Q signal").

The DAC 216 performs DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be bandpass filters or low pass filters.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the balun 234 or the RF IC 221 on the reception side during the reception. The baseband IC 211 or the RF IC 221 may control the switch 245. There may be another circuit that controls the switch 245, and the circuit may control the switch 245.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while maintaining the noise low. The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a unit that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

The detail explanation of each block is omitted because it is apparent from explanation of FIG. 1.

Thirteenth Embodiment

Figure 24A:
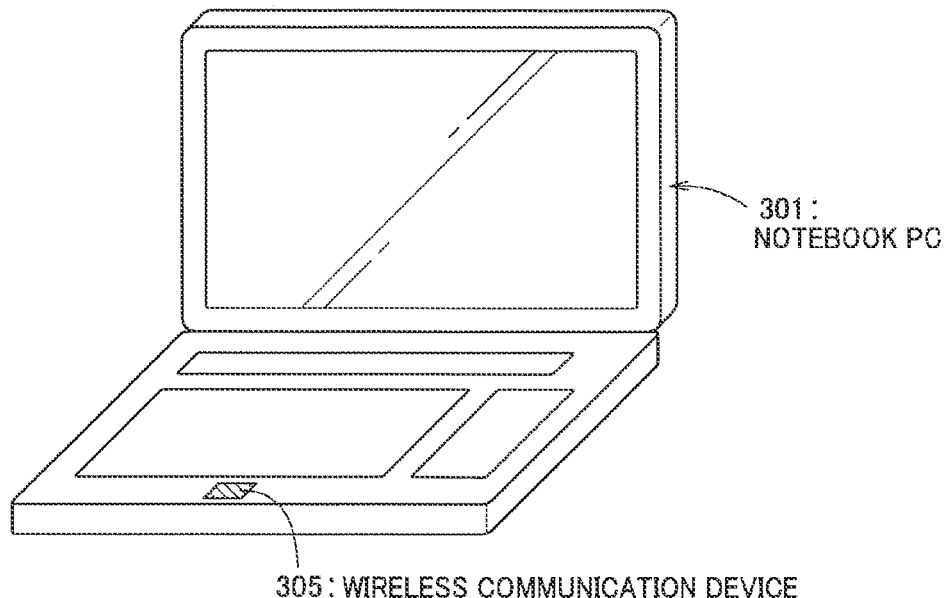
FIG. 24A is a perspective view of a wireless device according to the embodiment of the present invention.
Figure 24B:
FIG. 24B is a perspective view of a wireless device according to the embodiment of the present invention.

FIG. 24A and FIG. 24B are perspective views of wireless terminal according to the fourth embodiment. The wireless terminal in FIG. 24A is a notebook PC 301 and the wireless communication device (or a wireless device) in FIG. 24B is a mobile terminal 321. Each of them corresponds to one form of a terminal (which may indicate a base station). The notebook PC 301 and the mobile terminal 321 are equipped with wireless communication devices 305 and 315, respectively. The wireless communication device provided in a terminal (which may indicate a base station) which has been described above can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone and so on.

Figure 25:
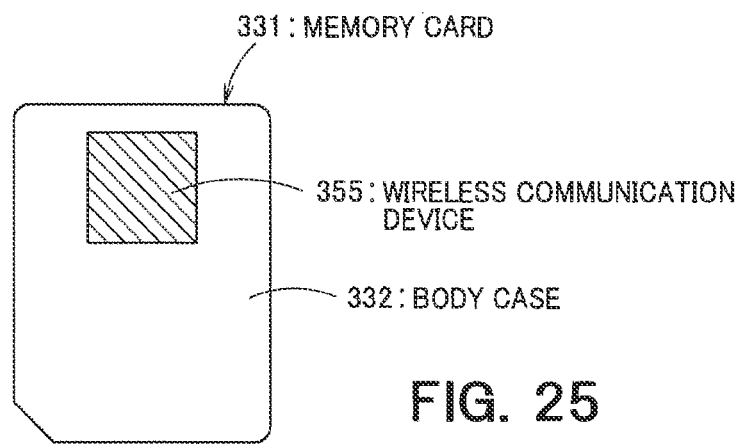
FIG. 25 is a diagram showing a memory card according to the embodiment of the present invention.

Moreover, a wireless communication device installed in a terminal (which may indicate a base station) can also be provided in a memory card. FIG. 25 illustrates an example of a wireless communication device mounted on a memory card. A memory card 331 contains a wireless communication device 355 and a body case 332. The memory card 331 uses the wireless communication device 355 for wireless communication with external devices. Here, in FIG. 25, the description of other installed elements (for example, a memory, and so on) in the memory card 331 is omitted.

Fourteenth Embodiment

In the fourteenth embodiment, a bus, a processor unit and an external interface unit are provided in addition to the configuration of the wireless communication device according to any of the embodiments. The processor unit and the external interface unit are connected with an external memory (a buffer) through the bus. A firmware operates the processor unit. Thus, by adopting a configuration in which the firmware is included in the wireless communication device, the functions of the wireless communication device can be easily changed by rewriting the firmware.

Fifteenth Embodiment

In the fifteenth embodiment, a clock generating unit is provided in addition to the configuration of the wireless communication device according to any of the embodiments. The clock generating unit generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

Sixteenth Embodiment

In the sixteenth embodiment, a power source unit, a power source controlling unit and a wireless power feeding unit are included in addition to the configuration of the wireless communication device according to any of embodiments. The power supply controlling unit is connected to the power source unit and to the wireless power feeding unit, and performs control to select a power source to be supplied to the wireless communication device. Thus, by adopting a configuration in which the power source is included in the wireless communication device, power consumption reduction operations that control the power source are possible.

Seventeenth Embodiment

In the seventeenth embodiment, a SIM card is added to the configuration of the wireless communication device according to any of the embodiments. For example, the SIM card is connected with the MAC processor 10, the MAC/PHY manager 60 or the controller 112 in the wireless communication device. Thus, by adopting a configuration in which the SIM card is included in the wireless communication device, authentication processing can be easily performed.

Eighteenth Embodiment

In the eighteenth embodiment, a video image compressing/decompressing unit is added to the configuration of the wireless communication device according to the sixteenth embodiment. The video image compressing/decompressing unit is connected to the bus. Thus, by adopting a configuration in which the video image compressing/decompressing unit is included in the wireless communication device, transmitting a compressed video image and decompressing a received compressed video image can be easily done.

Nineteenth Embodiment

In the nineteenth embodiment, an LED unit is added to the configuration of the wireless communication device according to any of the embodiments. For example, the LED unit is connected to at least one of the MAC processor 10, the MAC/PHY manager 60, the transmission processing circuit 113, the reception processing circuit 114 or the controller 112. Thus, by adopting a configuration in which the LED unit is included in the wireless communication device, notifying the operation state of the wireless communication device to the user can be easily done.

Twentieth Embodiment

In the twentieth embodiment, a vibrator unit is included in addition to the configuration of the wireless communication device according to any of the embodiments. For example, the vibrator unit is connected to at least one of the MAC processor 10, the MAC/PHY manager 60, the transmission processing circuit 113, the reception processing circuit 114 or the controller 112. Thus, by adopting a configuration in which the vibrator unit is included in the wireless communication device, notifying the operation state of the wireless communication device to the user can be easily done.

Twenty-First Embodiment

In the present embodiment, [1] the frame type in the wireless communication system, [2] a technique of disconnection between wireless communication devices, [3] an access scheme of a wireless LAN system and [4] a frame interval of a wireless LAN are described.

[1] Frame Type in Communication System

Generally, as mentioned above, frames treated on a wireless access protocol in a wireless communication system are roughly divided into three types of the data frame, the management frame and the control frame. These types are normally shown in a header part which is commonly provided to frames. As a display method of the frame type, three types may be distinguished in one field or may be distinguished by a combination of two fields. In IEEE 802.11 standard, identification of a frame type is made based on two fields of Type and Subtype in the Frame Control field in the header part of the MAC frame. The Type field is one for generally classifying frames into a data frame, a management frame, or a control frame and the Subtype field is one for identifying more detailed type in each of the classified frame types such as a beacon frame belonging to the management frame.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame. The response frame is, for example, an ACK frame or a BlockACK frame. The RTS frame and the CTS frame are also the control frame.

These three types of frames are subjected to processing based on the necessity in the physical layer and then transmitted as physical packets via an antenna. In IEEE 802.11 standard (including the extended standard such as IEEE Std 802.11ac-2013), an association process is defined as one procedure for connection establishment. The association request frame and the association response frame which are used in the procedure are a management frame. Since the association request frame and the association response frame is the management frame transmitted in a unicast scheme, the frames causes the wireless communication terminal in the receiving side to transmit an ACK frame being a response frame. The ACK frame is a control frame as described in the above.

[2] Technique of Disconnection Between Wireless Communication Devices

For disconnection of the connection (release), there are an explicit technique and an implicit technique. As the explicit technique, a frame to disconnect any one of the connected wireless communication devices is transmitted. This frame corresponds to Deauthentication frame defined in IEEE 802.11 standard and is classified into the management frame. Normally, it is determined that the connection is disconnected at the timing of transmitting the frame to disconnect the connection in a wireless communication device on the side to transmit the frame and at the timing of receiving the frame to disconnect the connection in a wireless communication device on the side to receive the frame. Afterward, it returns to the initial state in a communication phase, for example, a state to search for a wireless communication device of the communicating partner. In a case that the wireless communication base station disconnects with a wireless communication terminal, for example, the base station deletes information on the wireless communication device from a connection management table if the base station holds the connection management table for managing wireless communication terminals which entries into the BSS of the base station-self. For example, in a case that the base station assigns an AID to each wireless communication terminal which entries into the BSS at the time when the base station permitted each wireless communication terminal to connect to the base station-self in the association process, the base station deletes the held information related to the AID of the wireless communication terminal disconnected with the base station and may release the AID to assign it to another wireless communication device which newly entries into the BSS.

On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the frame to disconnect the connection cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Carrier Avoidance is a suitable scheme to share a radio medium between the plurality of wireless communication devices.

[4] Frame Interval of Wireless LAN

The frame interval of IEEE802.11 wireless LAN is described. There are six types of frame intervals used in IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in IEEE802.11 wireless LAN, and a strict period from a previous frame is not discussed. Therefore, the definition is followed in the explanation of IEEE802.11 wireless LAN system. In IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where priority according to the traffic type is not distinguished, AIFS is used in a case where priority by traffic identifier (TID) is provided.

Since operation is similar between DIFS and AIFS, an explanation below will mainly use AIFS. In IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails (when the received frame is determined to be error).

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Figure 26:
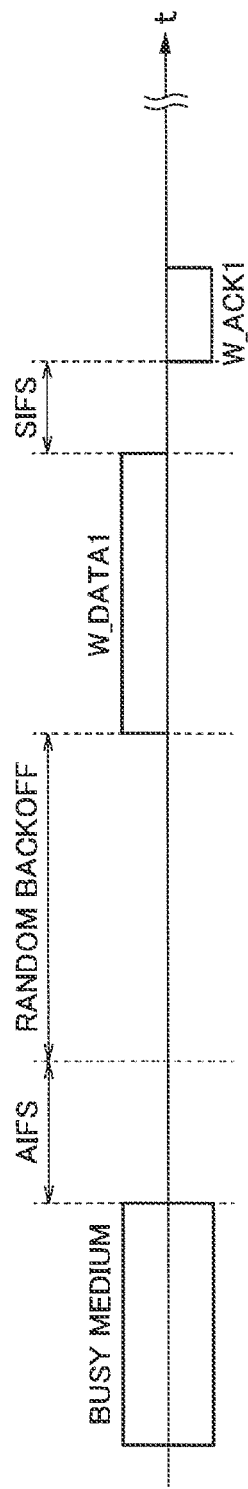
FIG. 26 is a diagram showing an example of frame exchange in a contention period.

Here, FIG. 26 illustrates one example of frame exchange in a competitive period based on the random access in IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters whose values being set according to each access category, such as AIFS, CWmin and CWmax, can be set independently by a communication group (which is a basic service set (BSS) in IEEE802.11 wireless LAN), the default values are defined.

For example, in the definition of 802.11ac, with an assumption that SIFS is 16 us and the slot time is 9 μs, and thereby PIFS is 25 μs, DIFS is 34 μs, the default value of the frame interval of an access category of BACKGROUND (AC_BK) in AIFS is 79 μs, the default value of the frame interval of BEST EFFORT (AC_BE) is 43 μs, the default value of the frame interval between VIDEO(AC_VI) and VOICE(AC_VO) is 34 μs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate. In the wireless communication device which can effectively takes EIFS, it may estimate an occupation time length of a PHY packet conveying a response frame directed to a PHY packet due to which the EIFS is caused and calculates a sum of SIFS, DIFS and the estimated time to take the EIFS. In the present embodiment, a wireless communication system using parameters at such interframe spaces is assumed to be an interfering system with a wide communication range.

The frames transmitted by the base station or the plurality of terminals may be different contents or the same contents. Generally, when it is expressed that the base station or the plurality of terminals transmits X-th frames or the base station receives X-th frames, the X-th frames may be the same or may be different.

Note that the frames described in the embodiments may indicate not only things called frames in, for example, IEEE 802.11 standard, but also things called packets, such as Null Data Packets.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

The invention claimed is:

1. A wireless communication device which communicates with first terminals compliant with a first standard, second terminals compliant with a second standard and third terminals compliant with a third standard within a communication group formed by the wireless communication device, comprising:
    transmitting circuitry configured to transmit a first frame that is a MAC (Medium Access Control) frame to the first terminals, the second terminals and the third terminals, wherein
        the first frame is a frame for notification of operation information of the communication group and the first frame includes a first field, and at least one of a second field or a third field,
        the first field is configured to include a first identifier of the first field and first information related to a first bandwidth used by the first terminals,
        the second field is configured to include a second identifier of the second field and second information used in combination with the first information, a combination of the first information and the second information designates a second bandwidth used by the second terminals if the second field is present, and the second bandwidth is designated by the first field otherwise, the third field is configured to include a third identifier of the third field and third information used in combination with the first information, a combination of the first information and the third information designates a third bandwidth used by the third terminals if the third field is present, and the third bandwidth is designated by a combination of the first information and the second information otherwise; and
    controlling circuitry configured to control the transmitting circuitry,
    wherein
        a maximum bandwidth that can be transmitted by the first terminals is the first bandwidth, a maximum bandwidth that can be transmitted by the second terminals is the second bandwidth and a maximum bandwidth that can be transmitted by the third terminals is the third bandwidth,
    wherein the transmitting circuitry is configured to
        transmit a second frame to at least one of the first terminals or the second terminals via at least one first channel which is included in the first bandwidth or the second bandwidth after the first bandwidth or the second bandwidth is designated to the at least one of the first terminals or the second terminals, and
        transmit a third frame to at least one of the third terminals via at least one second channel which is included in the third bandwidth after the third bandwidth is designated to the at least one of the third terminals, wherein the second frame and the third frame are transmitted in a frequency multiplexing, and wherein the at least one second channel is different from the at least one first channel.

2. The wireless communication device according to claim 1, wherein the first frame is a beacon frame, a probe response frame or an association response frame.

3. The wireless communication device according to claim 1, wherein the third field has a value identical to a value taken by the second field in a case where the third bandwidth is the same as the second bandwidth.

4. The wireless communication device according to claim 1, wherein the controlling circuitry is configured to determine whether to restrict a bandwidth of the first terminals or the second terminals to the first bandwidth or the second bandwidth narrower than the first maximum available bandwidth or the second maximum available bandwidth, wherein the transmitting circuitry is configured to transmit the first frame if the controlling circuitry determines to restrict to the first bandwidth or the second bandwidth.

5. The wireless communication device according to claim 4, wherein the controlling circuitry is configured to determine whether to restrict to the first bandwidth or the second bandwidth based on a relationship between:

the first maximum available bandwidth or the second maximum available bandwidth; and any one of a bandwidth for OFDMA (Orthogonal Frequency Division Multiple Access) communication and a bandwidth for a wireless communication system including the first terminals, the second terminals and the third terminals.

6. The wireless communication device according to claim 4, wherein the controlling circuitry is configured to determine whether to restrict to the first bandwidth or the second bandwidth based on information set by a user.

7. The wireless communication device according to claim 4, wherein the controlling circuitry is configured to determine whether to restrict to the first bandwidth or the second bandwidth, based on whether a function of OFDMA (Orthogonal Frequency Division Multiple Access) communication is enabled or not in the wireless communication device.

8. The wireless communication device according to claim 4, wherein the controlling circuitry is configured to determine whether to restrict to the first bandwidth or the second bandwidth, based on measurement of signal interference via at least one of channels included in a frequency band used by the first terminals or the second terminals.

9. The wireless communication device according to claim 4, wherein the controlling circuitry determines whether to restrict to the first bandwidth or the second bandwidth, based on a usage frequency of at least one of channels included in a frequency band used by the first terminals or the second terminals.

10. The wireless communication device according to claim 4, wherein the controlling circuitry determines whether to restrict to the first bandwidth or the second bandwidth, according to a frequency of acquisition of transmission rights for transmission of an RTS (Request to Send) frame for performing OFDMA (Orthogonal Frequency Division Multiple Access) in at least one of channels included in a frequency band used by the first terminals or the second terminals.

11. The wireless communication device according to claim 4, wherein the controlling circuitry is configured to determine whether to restrict to the first bandwidth or the second bandwidth according to a frequency of a CTS (Clear to Send) frame responded to an RTS frame transmitted for performing OFDMA (Orthogonal Frequency Division Multiple Access) or a frequency of success of frame transmission in the OFDMA performed, with respect to at least one of channels included in a frequency band used by the first terminals or the second terminals.

12. The wireless communication device according to claim 4, wherein the controlling circuitry is configured to determine whether to restrict to the first bandwidth or the second bandwidth, based on a relationship between a number of the first terminals and a number of the second terminals, or a relationship between a number of the second terminals and a number of the third terminals.

13. The wireless communication device according to claim 4, wherein when the controlling circuitry is configured to determine not to restrict to the first bandwidth or the second bandwidth, the transmitting circuitry is configured to transmit information to designate a bandwidth wider than the first bandwidth or the second bandwidth and narrower than or equal to the first maximum available bandwidth or the second maximum available bandwidth.

14. The wireless communication device according to claim 1, further comprising at least one antenna.

15. The wireless communication device according to claim 1, wherein the first terminals are IEEE 802.11n terminals, the second terminals are IEEE 802.11ac terminals, and the third terminals are IEEE802.11ax terminals.

16. The wireless communication device according to claim 1, wherein the first field, the second field and the third field are collectively included in a frame body field of the MAC frame.

17. The wireless communication device according to claim 1, wherein the at least one of the first terminals or the second terminals include a terminal performing a static response of CTS (Clear to Send) frame(s) to received RTS (Request to Send) frames, the third terminals each is a terminal performing a dynamic response of CTS frame(s) to received RTS frames, the first bandwidth is narrower than the maximum available bandwidth of the first terminals, and the second bandwidth is narrower than the maximum available bandwidth of the second terminals.

18. A wireless communication device which communicates with first terminals compliant with a first standard, second terminals compliant with a second standard and third terminals compliant with a third standard within a communication group formed by the wireless communication device, comprising:
- transmitting circuitry configured to transmit a first frame that is a MAC (Medium Access Control) frame to the first terminals, the second terminals and the third terminals, wherein
  - the first frame is a frame for notification of operation information of the communication group and the first frame includes a first field, and at least one of a second field or a third field,
  - the first field is configured to include a first identifier of the first field and first information related to a first bandwidth used by the first terminals,
  - the second field is configured to include a second identifier of the second field and second information used in combination with the first information, a combination of the first information and the second information designates a second bandwidth used by the second terminals if the second field is present, and the second bandwidth is designated by the first field otherwise, the third field is configured to include a third identifier of the third field and third information used in combination with the first information, a combination of the first information and the third information designates a third bandwidth used by the third terminals if the third field is present, and the third bandwidth is designated by a combination of the first information and the second information otherwise; and
- controlling circuitry configured to control the transmitting circuitry,
wherein
a maximum bandwidth that can be transmitted by the first terminals is the first bandwidth, a maximum bandwidth that can be transmitted by the second terminals is the second bandwidth and a maximum bandwidth that can be transmitted by the third terminals is the third bandwidth,
a bandwidth available for the third terminals having interpreted the combination of the first field and the third field is restricted to the third bandwidth if the third field exists in the first frame, and
  a bandwidth available for the third terminals is restricted to the second bandwidth if the third field does not exist in the first frame.

19. A wireless communication method performed in, a wireless communication device which communicates with first terminals compliant with a first standard, second terminals compliant with a second standard and third terminals compliant with a third standard within a communication group formed by the wireless communication device, the method comprising:
- transmitting a first frame that is a MAC (Medium Access Control) frame to the first terminals, the second terminals and the third terminals, wherein
  - the first frame is a frame for notification of operation information of the communication group and the first frame includes a first field, and at least one of a second field or a third field,
- the first field is configured to include a first identifier of the first field and first information related to a first bandwidth used by the first terminals,
- the second field is configured to include a second identifier of the second field and second information used in combination with the first information, a combination of the first information and the second information designates a second bandwidth used by the second terminals if the second field is present, and the second bandwidth is designated by the first field otherwise, and
- the third field is configured to include a third identifier of the third field and third information used in combination with the first information, a combination of the first information and the third information designates a third bandwidth used by the third terminals if the third field is present, and the third bandwidth is designated by a combination of the first information and the second information otherwise,
- a maximum bandwidth that can be transmitted by the first terminals is the first bandwidth, a maximum bandwidth that can be transmitted by the second terminals is the second bandwidth and a maximum bandwidth that can be transmitted by the third terminals is the third bandwidth,
- the method further comprises:
- transmitting a second frame to at least one of the first terminals or the second terminals via at least one first channel which is included in the first bandwidth or the second bandwidth after the first bandwidth or the second bandwidth is designated to the at least one of the first terminals or the second terminals; and
- transmitting a third frame to at least one of the third terminals via at least one second channel which is included in the third bandwidth after the third bandwidth is designated to the at least one of the third terminals,
- the second frame and the third frame are transmitted in a frequency multiplexing, and
- the at least one second channel is different from the at least one first channel.

20. A wireless communication device which communicates with first terminals compliant with a first standard, second terminals compliant with a second standard and third terminals compliant with a third standard within a communication group formed by the wireless communication device, comprising:
- transmitting circuitry configured to transmit a first frame that is a MAC (Medium Access Control) frame to the first terminals, the second terminals and the third terminals, wherein
  - the first frame is a frame for notification of operation information of the communication group and the first frame includes a first field, and at least one of a second field or a third field,
  - a first bandwidth that can be used by the first terminals is designated by the first field,
  - a second bandwidth that can be used by the second terminals is designated by a combination of the first field and the second field if the second field is present, and designated by the first field otherwise,
  - a third bandwidth that can be used by the third terminals is designated by a combination of the first field and the third field if the third field is present, and designated by a combination of the first field and the second field otherwise; and
- controlling circuitry configured to control the transmitting circuitry, wherein
- a maximum bandwidth that can be transmitted by the first terminals is the first bandwidth, a maximum bandwidth that can be transmitted by the second terminals is the second bandwidth and a maximum bandwidth that can be transmitted by the third terminals is the third bandwidth, and
- the transmitting circuitry is configured to transmit a second frame to at least one of the first terminals or the second terminals via at least one first channel which is included in the first bandwidth or the second bandwidth after the first bandwidth or the second bandwidth is designated to the at least one of the first terminals or the second terminals and transmit a third frame to at least one of the third terminals via at least one second channel which is included in the third bandwidth after the third bandwidth is designated to the at least one of the third terminals, the second frame and the third frame are transmitted in a frequency multiplexing, and the at least one second channel is different from the at least one first channel.

21. A wireless communication method performed in, a wireless communication device which communicates with first terminals compliant with a first standard, second terminals compliant with a second standard and third terminals compliant with a third standard within a communication group formed by the wireless communication device, the method comprising:

transmitting a first frame that is a MAC (Medium Access Control) frame to the first terminals, the second terminals and the third terminals, wherein the first frame is a frame for notification of operation information of the communication group and the first frame includes a first field, and at least one of a second field or a third field, the first field is configured to include a first identifier of the first field and first information related to a first bandwidth used by the first terminals, the second field is configured to include a second identifier of the second field and second information used in combination with the first information, a combination of the first information and the second information designates a second bandwidth used by the second terminals if the second field is present, and the second bandwidth is designated by the first field otherwise, and the third field is configured to include a third identifier of the third field and third information used in combination with the first information, a combination of the first information and the third information designates a third bandwidth used by the third terminals if the third field is present, and the third bandwidth is designated by a combination of the first information and the second information otherwise, a maximum bandwidth that can be transmitted by the first terminals is the first bandwidth, a maximum bandwidth that can be transmitted by the second terminals is the second bandwidth and a maximum bandwidth that can be transmitted by the third terminals is the third bandwidth, a bandwidth available for the third terminals having interpreted the combination of the first field and the third field is restricted to the third bandwidth if the third field exists in the first frame, and a bandwidth available for the third terminals is restricted to the second bandwidth if the third field does not exist in the first frame.

* * * * *